(12) United States Patent
Cao et al.

(10) Patent No.: US 11,988,343 B2
(45) Date of Patent: May 21, 2024

(54) RUGGED ALL PURPOSE LIGHTING CUBE

(71) Applicant: LOGITECH EUROPE S.A., Lausanne (CH)

(72) Inventors: Wei Cao, Shanghai (CN); Simon Shi, Shanghai (CN); Yoy Dai, Shanghai (CN); Scott Gant, Poway, CA (US)

(73) Assignee: LOGITECH EUROPE S.A., Lausanne (CH)

(*) Notice: Subject to any disclaimer, the term of this patent is extended or adjusted under 35 U.S.C. 154(b) by 650 days.

(21) Appl. No.: 15/784,082

(22) Filed: Oct. 13, 2017

(65) Prior Publication Data

US 2020/0011491 A1   Jan. 9, 2020
US 2023/0367110 A9   Nov. 16, 2023

Related U.S. Application Data

(60) Provisional application No. 62/407,545, filed on Oct. 13, 2016.

(30) Foreign Application Priority Data

Feb. 6, 2017   (CN) .......................... 201720112835.5

(51) Int. Cl.
*F21L 4/02* (2006.01)
*F21L 4/08* (2006.01)
(Continued)

(52) U.S. Cl.
CPC ............ *G02B 19/0066* (2013.01); *F21L 4/02* (2013.01); *F21L 4/08* (2013.01); *F21V 5/008* (2013.01);
(Continued)

(58) Field of Classification Search
CPC .. F21L 4/02; F21V 15/01; F21V 31/00; F21V 31/005; F21V 5/008; G03B 15/06;
(Continued)

(56) References Cited

U.S. PATENT DOCUMENTS 2,985,062 A * 5/1961 Clapp .................... G03B 27/73
                                                                    355/37
3,716,298 A * 2/1973 Reardon .............. G03B 27/545
                                                                    355/71

(Continued)

FOREIGN PATENT DOCUMENTS

KR    20120060086 A * 6/2012 .............. F21V 17/10
TW      201704814 A  * 2/2017 ............... F21K 2/00

OTHER PUBLICATIONS

M.S. Kang et al, "LED Light Module", Jun. 11, 2012, EPO, Machine English Translation of KR20120060086A, pp. 1-15. (Year: 2012).*

(Continued)

*Primary Examiner* — Alan B Cariaso
(74) *Attorney, Agent, or Firm* — Patterson & Sheridan, LLP.

(57) ABSTRACT

The disclosure generally relates to generating lighting in an efficient way while in the outdoors. The designs are meant to maximize the amount of light generated, by the smallest assembly that is rugged to use in general outdoor activities and water sports. Further designs are related to hands-free mounting capabilities on outdoor equipment such as bikes, surfboards, snowboards and other similar equipment. Additional features include various filters, waterproofing, recharging or lighting differences which provide greater visual or photographic advantages to the user.

10 Claims, 18 Drawing Sheets

(51) Int. Cl.
  *F21V 5/00* (2018.01)
  *F21V 15/01* (2006.01)
  *F21V 21/088* (2006.01)
  *F21V 23/00* (2015.01)
  *F21V 23/06* (2006.01)
  *F21V 29/74* (2015.01)
  *F21V 31/00* (2006.01)
  *F21W 131/40* (2006.01)
  *F21Y 105/16* (2016.01)
  *F21Y 115/10* (2016.01)
  *G02B 1/11* (2015.01)
  *G02B 19/00* (2006.01)
  *G03B 15/05* (2006.01)
  *H02J 7/00* (2006.01)

(52) U.S. Cl.
  CPC ............ *F21V 15/01* (2013.01); *F21V 23/007* (2013.01); *F21V 23/06* (2013.01); *F21V 29/74* (2015.01); *F21V 31/005* (2013.01); *G02B 19/0009* (2013.01); *G02B 19/0061* (2013.01); *G03B 15/05* (2013.01); *H02J 7/00* (2013.01); *H02J 7/0042* (2013.01); *H02J 7/00714* (2020.01); *F21V 21/0885* (2013.01); *F21W 2131/40* (2013.01); *F21Y 2105/16* (2016.08); *F21Y 2115/10* (2016.08); *G02B 1/11* (2013.01); *G03B 2215/0542* (2013.01); *G03B 2215/0567* (2013.01); *G03B 2215/0592* (2013.01)

(58) Field of Classification Search
  CPC .... G03B 2215/0542; G03B 2215/0567; G03B 2215/0592; G03B 15/05; G02B 19/0009; G02B 19/0061; G02B 19/0066; F21W 2131/40; F21Y 2105/16

USPC .................................... 362/16–18, 278, 320
  See application file for complete search history.

(56) References Cited

U.S. PATENT DOCUMENTS

| | | | | |
|---|---|---|---|---|
| 4,574,338 | A * | 3/1986 | Takasaki | B29D 11/0074 362/278 |
| 5,311,409 | A * | 5/1994 | King | G03B 15/06 362/17 |
| 6,400,905 | B1 * | 6/2002 | Tenmyo | G03B 15/06 362/17 |
| 7,331,681 | B2 * | 2/2008 | Pohlert | F21V 14/06 348/E5.029 |
| 7,841,752 | B2 | 11/2010 | Lee | |
| 9,097,957 | B2 | 8/2015 | Pohlert et al. | |
| 9,110,355 | B1 | 8/2015 | Nourbakhsh | |
| 2004/0012953 | A1 * | 1/2004 | Clemente | F21L 4/00 362/158 |
| 2005/0117318 | A1 * | 6/2005 | Tenmyo | G02B 3/0087 362/16 |
| 2006/0250789 | A1 | 11/2006 | Coushaine | |
| 2008/0212316 | A1 * | 9/2008 | Routledge | F21V 3/04 362/227 |
| 2009/0310342 | A1 | 12/2009 | Chang | |
| 2011/0235313 | A1 * | 9/2011 | Canella | F21L 4/00 362/157 |
| 2017/0102116 | A1 * | 4/2017 | Sherry | F21V 31/00 |
| 2017/0343185 | A1 * | 11/2017 | Fieberg | F21V 5/045 |

OTHER PUBLICATIONS

Y. Kawakami et al, "Illumination Device, Illumination Method, And Image Projection Device Using Same", Feb. 1, 2017, Merged Text of Machine English Translation of TW 201704814 A. (Year: 2017).*

* cited by examiner

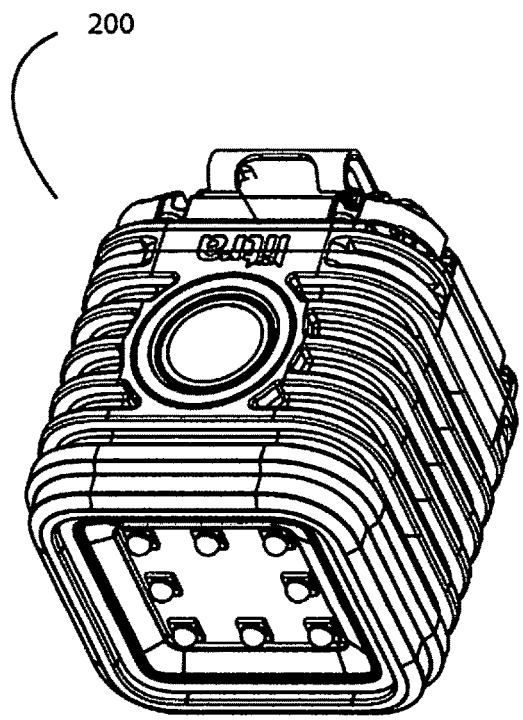
Figure 12 A
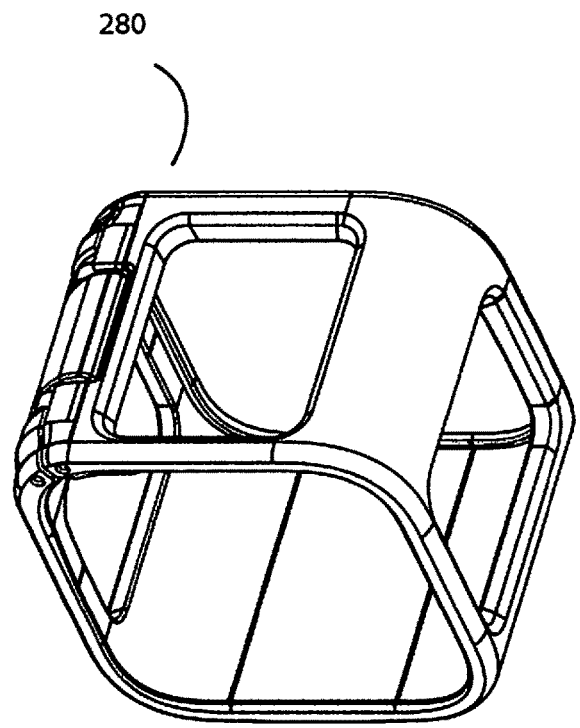
Figure 12 B
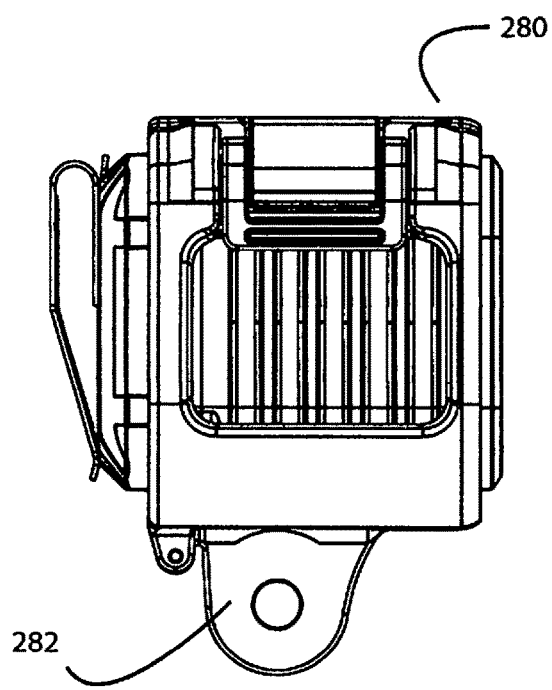
Figure 12 C
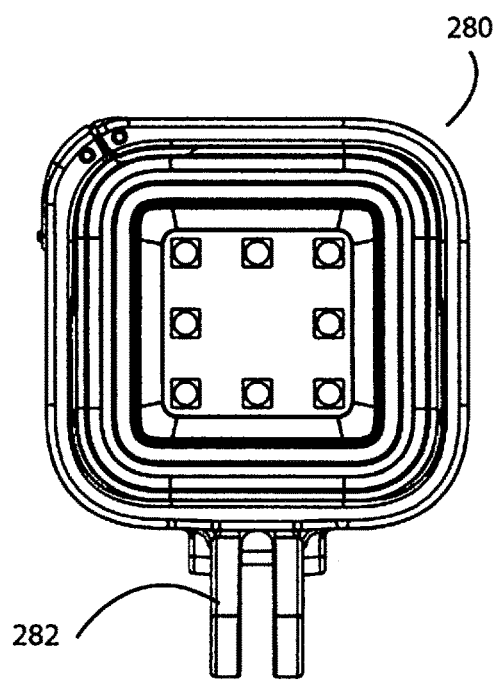
Figure 12 D
Figure 12

RUGGED ALL PURPOSE LIGHTING CUBE

BACKGROUND OF THE INVENTION

Field of the Invention

The invention relates generally to lighting assemblies and more specifically to a rugged all purpose lighting assembly comprising improvements in waterproof performance of the USB charging interface of the lamp; improvements in the light-fill field of illumination technology, and to a portable lamp and a control method thereof.

Background Information

As people are more active there is always a challenge to remain active once the light subsides or when in low light areas. Although various flashlights and lighting devices have been around for hundreds of years there are still areas/activities and limitations that have not been adequately illuminated. Unfortunately, a rugged all purpose lighting assembly that provides a high lighting output yet in a very small apparatus able to go almost anywhere and easily mountable has not yet been described. Thus, a need exists for such a easily transportable/mountable, lightweight, powerful, versatile, rugged, waterproof lighting assembly for the active individual.

The invention relates generally to lighting assemblies and more specifically to a rugged all purpose lighting assembly comprising improvements in waterproof performance of the USB charging interface of the lamp; improvements in the field of illumination technology, and more particularly to a fixture for a photographic camera device. The present invention relates to the field of portable lighting technology, and more particularly to a portable lamp and a control method thereof.

One specific example of rugged outdoor in recent years, diving sports are widely popular, diving enthusiasts will carry out underwater survey, salvage, repair and underwater works and other operations. This requires lighting to provide lighting, due to the underwater operating time is longer, the existing fixtures use rechargeable batteries. Through the lamp on the USB charging interface to the lamp battery charging, to extend underwater operating time. Because it is through the USB charging interface for lamp charging, USB charging interface to an external power supply, USB cannot be completely sealed. Once the fixture works underwater, there may be water leakage phenomenon, will lead to the internal power supply short circuit, lighting cannot provide lighting effect underwater operations. Therefore, it is necessary to enhance the waterproof performance of the USB charging interface on the lamp.

Photographic camera equipment in the shooting process, if the brightness of the environment is too low, it will make the photo shoot out more black, at this time, you need to shoot compensation when shooting, Or fill light.

Fill light is a method of photographing by changing the irradiation of an external light source, mainly in the backlight, side when used in reverse light. Fill light mainly through the light filling equipment, such as flash, reflector or other reflective material for additional lighting. Specifically, the flash uses the flash when shooting to supplement the lighting, the reflector utilizes the light to be reflected on the object being photographed for illumination. However, in the prior art, the light of the light filling device is a wide range of scattered, and cannot be completely gathered in the light photography camera shooting angle, resulting in a waste of light outside the shooting angle.

The present embodiments relate to embodiments for creating a versatile rugged outdoor light that addresses one or more of the deficiencies identified above.

SUMMARY OF THE INVENTION

The embodied lighting assemblies feature 2 or more LED lights, encased in a durable housing; wherein the durable housing provides waterproof protection to at least 20 feet below the surface; wherein the durable housing includes heat dissipation features; wherein the lighting apparatus is less than 2 inches by 2 inches in size; and is in the general shape of a cube; wherein the lighting apparatus generates greater than 1000 lumens of light.

In additional embodiments the lighting assembly may be modified to fit within commercially available camera storage brackets.

Thus, the embodiments of the present invention relate to a lighting assembly that is small enough to be easily transported and can be housed in standard mobile camera cages such as the GoPro line of camera cages.

The embodiments of the present invention relate to a lighting assembly that produces greater than 1000 Lumens, and has a range between 1000 and 3000 lumens with a preferred maximum lumen production of 1500 to 2500 lumens.

Some embodiments of the present lighting assembly include beam angles which match the human eye, a GoPro wide angle, and/or have an 80 degree illumination angle.

Some embodiments of the present lighting assembly include a blended/smooth lux beam which results in no center hot spot.

Additional embodiments include a lighting assembly that is flicker free.

Additional embodiments include lighting assembly with battery life from 2 to 10 hours.

Additional embodiments feature a standard micro USB charge port/with a constant charge and light feature.

Additional embodiments feature a lighting assembly that is waterproof up to 10 m/30 ft.

Additional embodiments include a 810G MTh SPEC.

Additional embodiments include embedded magnet mounting.

Additional embodiments include Intelligent thermal management.

Additional embodiments may include a simple one touch button operation or a plurality of buttons associated with the different light banks.

Water Proof Aspects:

Embodiments of the present invention include a lamp comprising: a housing having an inner cavity; a circuit board provided in said cavity; a USB charging interface electrically connected to the circuit board; a conductive sealant filled in the gap between the USB charging interface and the circuit board. The existence of the conductive sealant of the utility model eliminates the gap between the USB charging interface and the circuit board, so that the water cannot penetrate into the circuit board, reducing the risk of the circuit board short circuiting, and improves the waterproof performance of the USB charging interface of the lamp.

The embodiments of the present invention provide for a lamp comprising: a housing having an inner cavity; a circuit board provided in said cavity; a USB charging interface electrically connected to the circuit board; a conductive sealant filled in a gap between the USB charging interface and the circuit board.

Optionally, the USB charging interface has a first surface facing the circuit board, the first surface having an axial gap with the circuit board, the axial gap being filled with a conductive sealant.

Optionally, the USB charging interface further has a plurality of second surfaces disposed about the first surface and extending in a direction away from the circuit board, the first surface located in the circuit and the second surface; the second surface has a radial gap with the housing, the radial gap being filled with a conductive sealant.

Optionally, the USB charging interface has a pin mounted on the first surface, the pin being electrically connected to the circuit board, the conductive sealant wrapping the pin.

Optionally, a rechargeable battery is also provided, electrically connected to the circuit board, located within the cavity, the circuit board being located between the rechargeable battery and the USB charging interface.

Optionally, further comprising a light source provided in said cavity, electrically connected to said rechargeable battery, and light generated by said light source being capable of being transmitted through said housing.

Optionally, the housing is a transparent housing.

Optionally, the circuit board is PCBA.

Optionally, the USB charging interface is provided to the circuit board and the opening of the USB charging interface is locate on the surface of the housing.

Optionally, the conductive sealant is bonded to the USB charging interface and the circuit board, respectively.

The improved waterproofing aspects of the embodied rugged outdoor lights provides for the following advantages:

The charging cavity of the shell of the utility of the utility model lamp is provided with a circuit board and a USB charging interface in the cavity of the utility model, and the USB charging interface is electrically connected with the circuit board. Once the USB charging interface is not sealed, there is a gap between the USB charging interface and the circuit board, when the lamp is underwater, the water will penetrate into the circuit board, causing a short circuit of the circuit board. The utility model is filled with a conductive sealant in the gap between the USB charging interface and the circuit board. The presence of conductive sealant not only eliminates the gap between the USB charging interface and the circuit board, but also does not affect the electrical connection between the USB charging interface and the circuit board, so that water cannot penetrate into the circuit board, reducing the risk of a circuit board short circuit. Which enhances the lamp's USB charging interface waterproof performance.

Light-Fill Technology Aspects

The lightfill embodiments solves the problem that when using a photographic camera apparatus of the prior art when in the process of photographing, the light of its fill light equipment consists of a wide range of scattered light, which leads to a waste of light outside the shooting angle. To solve these problems, embodiments of the present invention provide for a lamp for a photographic camera device, including a light emitting component; also included are a diffuser and a condenser lens, the light-emitting member, the diffuser, and the condenser lens are provided in this order so that the light emitted from the light-emitting member is irradiated to the outside through the diffuser and the condenser lens in this order.

Optionally, the condenser lens is a Fresnel lens or a convex lens.

Optionally, the condenser lens is provided with an antireflection film on one side of the light emitting member and/or the side of the condenser lens facing the light emitting member is coated with an antireflection film, The permeable membrane is used to increase the intensity of transmitted light.

Optionally, the condenser lens is a Fresnel lens, the lamp further comprising a protective lens fixedly disposed on the side of the Fresnel lens having a texture, the protective lens and the Fresnel lens to form a first sealed cavity there between.

Optionally, the lamp housing has a second sealing cavity having a wall surface through which light is transmitted, the light emitting member being fixedly disposed within the second sealed cavity.

Optionally, the wall is used as the light mask.

Optionally, the second sealing cavity has a bottom wall disposed opposite to the flexible mask and an annular side wall surrounding the bottom wall, the annular side wall being provided with an annular groove, the hood is fixedly disposed within the annular groove.

Optionally, the annular groove extends axially through one end of the annular side wall, and the flexible mask is glued in the annular groove.

Optionally, the lamp further comprises: an annular support having a first annular end and a second annular end in the axial direction thereof, the condenser lens being fixedly disposed at the first annular end And said second annular end portion is provided outside said lamp vessel.

Optionally, the second annular end portion is detachably provided outside the lamp vessel.

Compared with the prior art, the technical scheme of the lightfill embodiments has the following advantages:

The light fixture of the present invention has a light-emitting member and a condenser lens as a light-collecting device for photographing, and the light emitted from the light-emitting member can be collected by the condenser lens, so that the light rays emitted at the respective angles emitted by the light-emitting member to the condenser lens, can be collected by a condenser lens into a specific area, if the shooting area is located in the area where the light is collected, it can effectively increase the brightness of the object to achieve lighting; and, because the light is collected, the shooting angle outside the light is less, more effectively using light, and not leading to a waste of light outside the shooting angle.

Recharging Aspects

Further embodiments include a portable lamp and its control method. The method comprises detecting whether or not the portable lamp is externally connected with a power supply; when the portable lamp is connected to the external power source and the lighting control command is detected, the operating current of the lighting circuit is adjusted, and it will simultaneously detect the current state of the rechargeable battery to keep the rechargeable battery in a fully charged state. Applying the above method while the light is on and charging at the same time can reduce the harmful effects to the battery and prolong its life.

The technical problem solved by the embodied recharging methods and apparatus is how to reduce the influence of edge-charging on the life of a rechargeable battery in a rechargeable portable lamp.

In order to solve the above technical problems, an embodiment of the present invention provides a control method of a portable lamp including a rechargeable battery and a lighting circuit, the lighting circuit being coupled to the rechargeable battery, and the lighting circuit and wherein the rechargeable battery is adapted to an external power source, the control method comprising: detecting whether or not the portable lamp is an external power source; adjusting the operation of the lighting circuit when the portable lamp is connected to an external power source and detecting an illumination control command current and simultaneously detecting the current state of said rechargeable battery to keep said rechargeable battery in a fully charged state.

Optionally, the detection of the current state of the rechargeable battery includes detecting a charging current and a discharge current of the rechargeable battery using a battery state detection circuit and determining the charge current and the discharge current based on the detected charging current and the discharge current, The current state of the rechargeable battery.

Optionally, adjusting the operating current of the illumination circuit comprises reducing the operating current of the illumination circuit.

Optionally, the lighting control instructions are input in any of the following ways: a touch interface mode; a key mode; a voice mode; a remote control mode.

Additional embodiments also provide for a portable lamp comprising: a rechargeable battery; an illumination circuit; an input circuit adapted to input an illumination control command; a current regulating circuit adapted to adjust an operating current of the lighting circuit; a battery state detection circuit adapted to detect a current state of the rechargeable battery; a control circuit coupled to the input circuit, the current regulating circuit and the battery state detection circuit, adapted to detect, when the portable lamp is connected to an external power source and detects a lighting controlling the current regulating circuit to adjust the operating current of the lighting circuit while controlling the battery state detecting circuit to detect the current state of the rechargeable battery to keep the rechargeable battery in a fully charged state.

Optionally, the battery state detection circuit is adapted to detect a charging current and a discharge current of the rechargeable battery and to input a detection result to the control circuit.

Optionally, the battery state detection circuit includes a first detection sub-circuit adapted to detect a charging current of the rechargeable battery and a second detection sub-circuit adapted to detect a discharge current of the rechargeable battery.

Optionally, the first sense sub-circuit and the second sense sub-circuit are of the same structure and each comprising: a first resistor, a second resistor, an amplifier, a PMOS transistor and a third resistor, wherein: the first resistor and the amplifier and the source of the PMOS tube; the second resistor is coupled to the positive input terminal of the amplifier; the output end of the amplifier is coupled with the gate of the PMOS tube; the source of the PMOS tube is coupled with the substrate, the drain is grounded through the third resistor; and the first resistance is the same as the second resistance value.

Optionally, the portable lamp further comprises: a first voltage conversion circuit and a second voltage conversion circuit, wherein: said first voltage conversion circuit, the input terminal is connected with the charging port, the output terminal is coupled with the rechargeable battery and the control circuit, a voltage suitable for voltage input to said charging port, obtaining a voltage suitable for input to the rechargeable battery and the control circuit; said second voltage conversion circuit, the input terminal is coupled with the first voltage conversion circuit, the output terminal is coupled with the current regulating circuit, adapted to voltage-convert said first voltage conversion circuit to obtain an operating voltage suitable for operation of said lighting circuit and to maintain a preset second voltage value.

Optionally, the current regulating circuit is adapted to reduce the operating current of the lighting circuit when the rechargeable battery is in a charged state and receiving an illumination control command.

Optionally, the portable fixture further comprises a circuit detection circuit coupled to the current regulating circuit and adapted to detect an operating current of the lighting circuit and to feed back to the control circuit.

Optionally, the portable lighting device is any one of the following: a touch interface; a voice unit; a keypad; a remote command receiving unit.

According to the above embodiments, since the current inputted by the portable lamp external power supply is partly used as the operating current of the portable lamp and the other part is the charging current of the rechargeable battery, when the portable lamp is connected to the power source and the lighting control command is detected, the operating current of the portable lamp is such that the rechargeable battery is always in a state of being charged, so that the repetitive switching of the chargeable state of the rechargeable battery can be avoided, and the number of charge and discharge times of the rechargeable battery can be reduced, thereby improving the life of the rechargeable battery.

BRIEF DESCRIPTION OF THE DRAWINGS

FIG. 12 consists of FIGS. 12A-12D wherein; FIGS. 12A and 12B shows another embodied lighting assembly with multiple views and configured to be placed in a mounting cage separately shown; and FIGS. 12C and 12D shows the embodied lighting assembly with multiple views of the assembly after being placed within a mounting cage.

DETAILED DESCRIPTION OF THE INVENTION

The present invention is based on adventure ready LED lighting assemblies with improved waterproof abilities, recharging abilities and light filtering capacities.

The embodied lighting assemblies are designed to provide a combination of smaller size, increased lighting abilities and functions, easier mounting and/or handling and more accessible in difficult or active environments to produce better mobile light for photo and video professionals.

The embodied lighting assemblies are contemplated for generating light for everyday tasks at home, at work, with a smart phone and for walking and biking but also to generate the mobile light available for outdoor enthusiasts and extreme athletes.

When designing some embodiments of the lighting assemblies the inspiration was provided to be able to provide a high volume of light that could go anywhere a GoPro or similar mobile camera can go.

The embodied assemblies are generally a cube in shape and less than 2 inches by 2 inches. Some embodied assemblies are designed specifically to Fit into the GoPro Session Frame and GoPro mounting system.

The embodied assemblies Match or exceed waterproof and drop test specifications of GoPro cameras or similar type mobile adventure gear.

The embodied Light beam angle complements a GoPro type camera lens' wide angle and the embodied assembly matches the battery life of many GoPro type mobile cameras.

The embodied assemblies are designed to be the "Swiss Army Knife" of lights so embodiments include:

TWO ¼ 20 standard camera mounts to allow for flexible mounting orientations.

One or more magnets built into the body to quickly mount to a car hood, tail gate, pole etc.

Optional FILTERS for photographic, dive and mood effects=serious photos or serious fun!

SOFT LIGHT with a diffusion cap for a lantern like glow.

Other versatile arrangements or different lighting colors and intensities are embodied in the present invention.

QUICK CLIP for a simple and secure way to mount to a belt or backpack

The following examples are intended to illustrate but not limit the invention.

Waterproof Aspects:

The existing lamps through the USB charging interface for lamp charging, when the lights in the water under the operation, USB charging interface to be waterproof, otherwise it will affect the normal use of lamp s The utility model can fill the gap between the USB charging interface and the circuit board by filling the gap between the USB charging interface and the circuit board, so that the water can not penetrate into the circuit board and reduce the circuit board short-circuit risk, and enhance the lamp's USB charging interface waterproof performance.

In order to make the above-mentioned objects, features and advantages of the utility model more easily understood, specific embodiments of the utility model will be described in detail with reference to the accompanying drawings.

Figure 1:
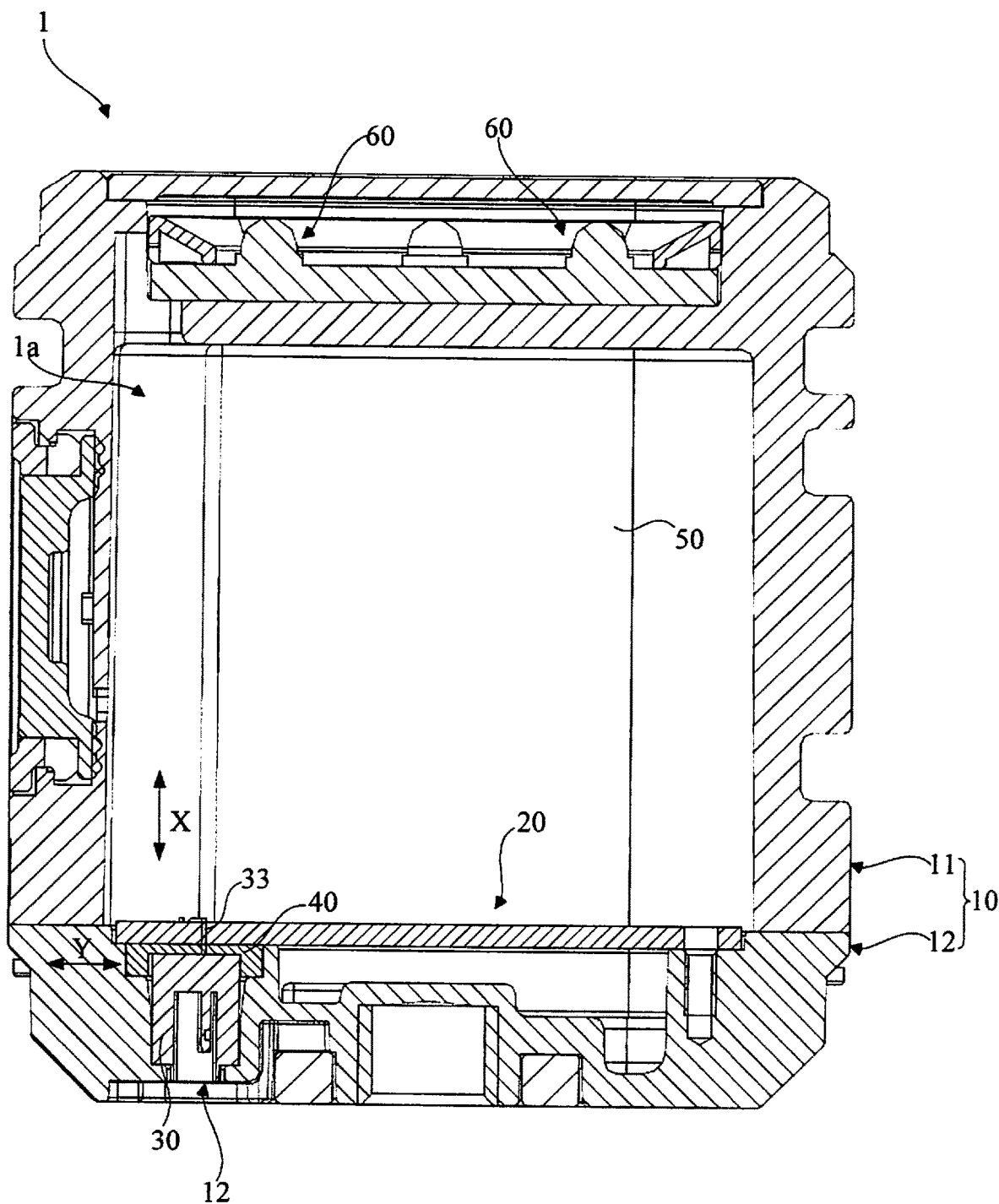
FIG. 1 is a perspective view of an embodied lighting assembly; the dashed box in FIG. 1 represents a cross-section shown in FIG. 3.
Figure 2:
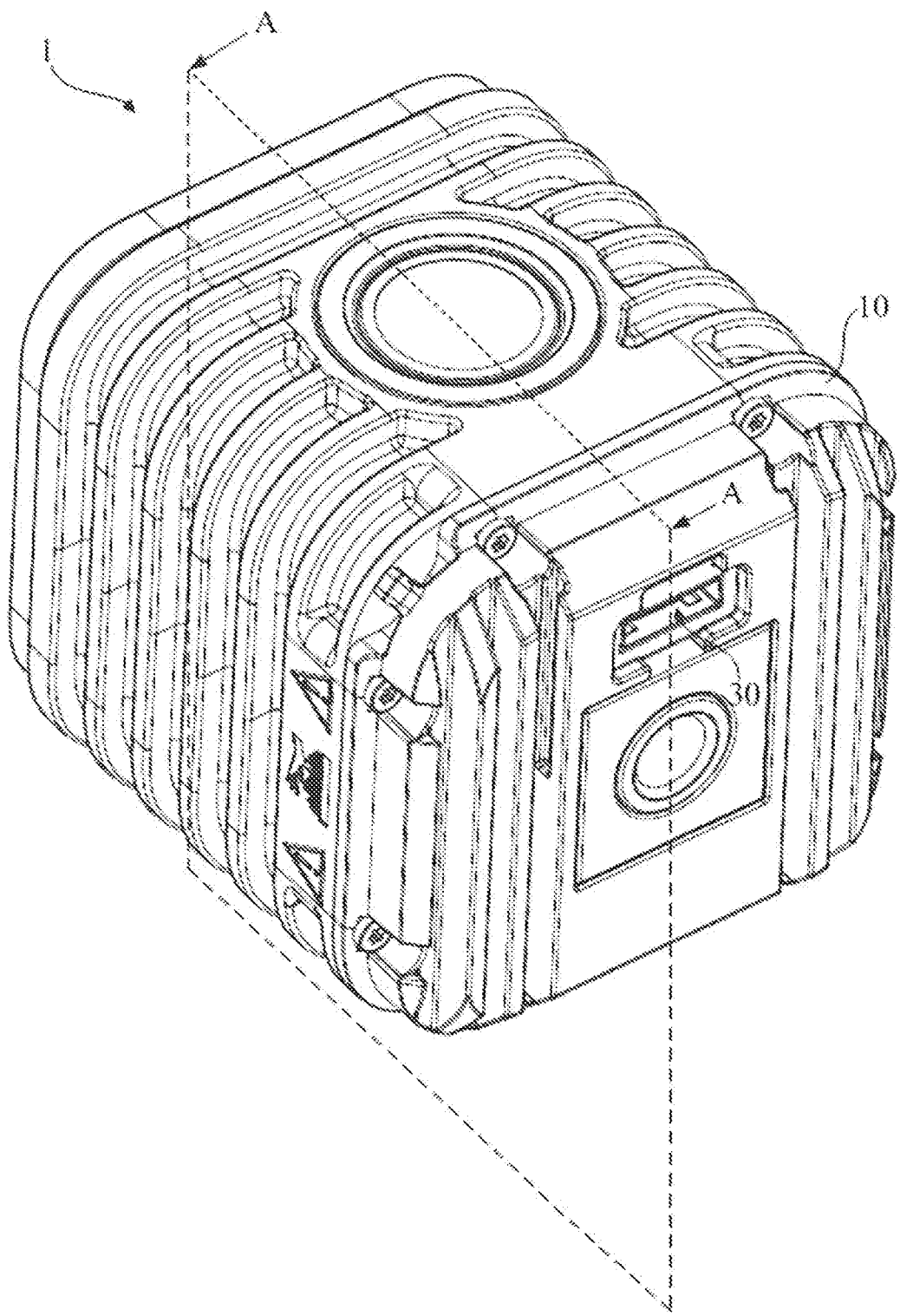
FIG. 2 is a perspective exploded view of an embodied lighting assembly of FIG. 1.
Figure 3:
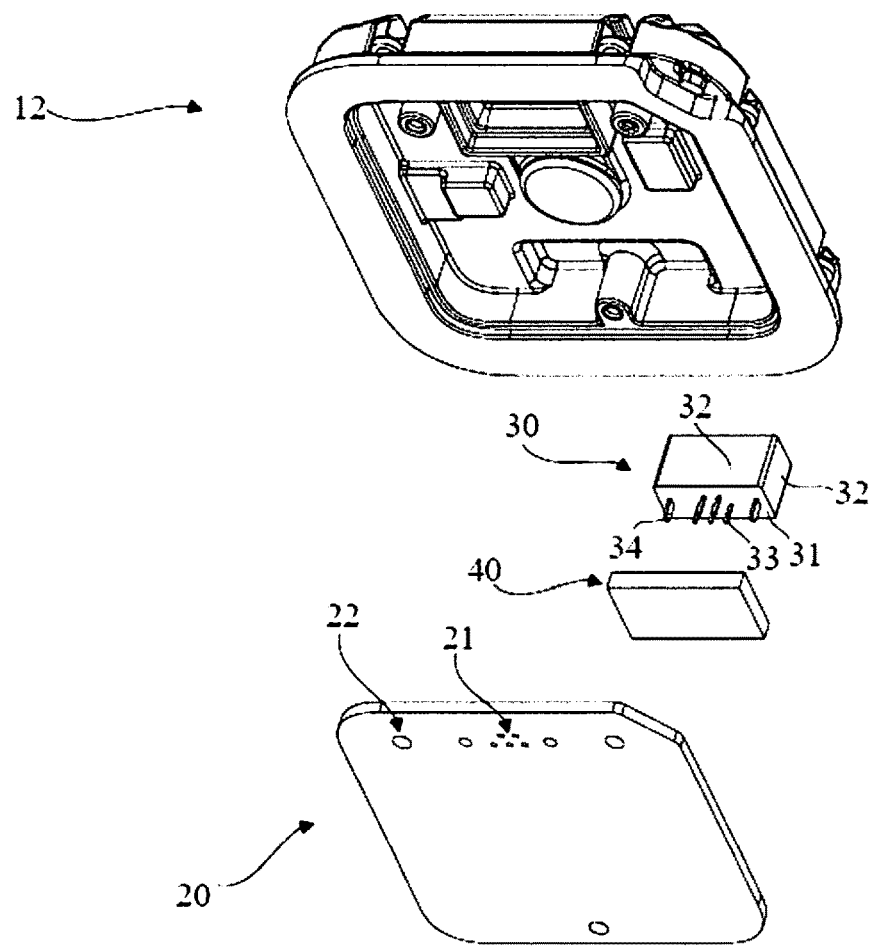
FIG. 3 is a cross-sectional view of an embodied lighting assembly taken along the line A-A shown in FIG. 1.
Figure 3:
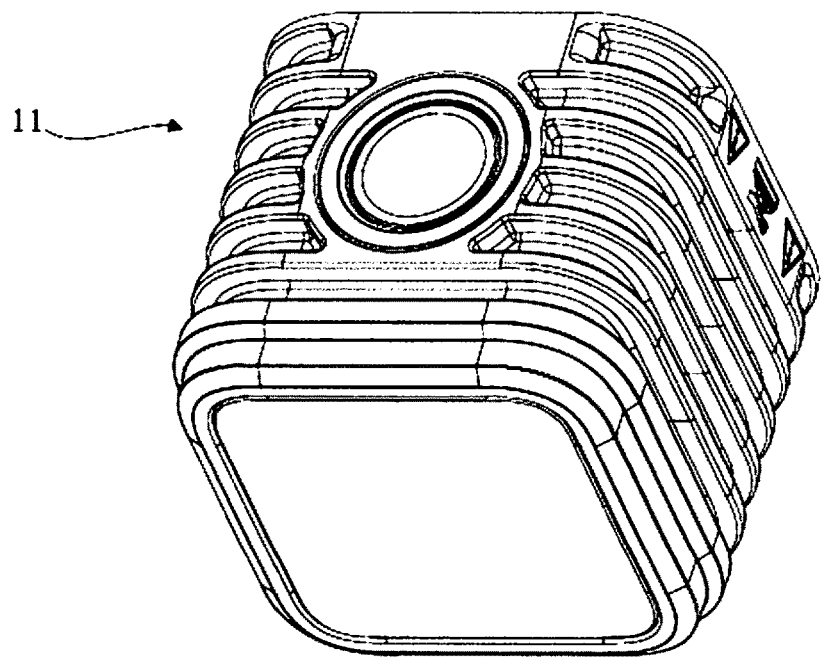

Referring to FIG. 1, the utility model provides a lamp 1 having a USB charging interface 30. Referring to FIG. 1, the opening of the USB charging interface 30 is located on the surface of the housing 10 of the lamp 1 for charging the lamp 1 for an external power source (not shown). Referring to FIGS. 2 and 3, the housing 10 of the lamp 1 includes a first housing 11 and a second housing 12, the first housing 11 and the second housing 12 being connected, and the connection of the two housings is not limited and may be connected by welding or by bolts together.

With continued reference to FIG. 1, the rechargeable battery 50 is provided in the inner chamber 1a of the first housing 11 of the lamp 1, light source 60 and circuit board 20; a USB charging interface 30 is provided in the second housing 12 of the lamp 1. As shown in FIG. 1 among them, the circuit board 20 is a PCBA (Printed Circuit Board+ Assembly), along the axial direction (shown in the direction X in FIG. 1) the circuit board 20 is located between the rechargeable battery 50 and the USB charging interface 30, the rechargeable battery 50 is located between the lamp source 60 and the circuit board 20. The USB charging interface 30 is electrically connected to the circuit board 20, the rechargeable battery 50 is electrically connected to the circuit board 20, the light source 60 is electrically connected to the rechargeable battery 50.

The USB charging interface 30 can be electrically connected to the rechargeable battery 50 through the circuit board 20 after an external power source, the rechargeable battery 50 of the lamp 1 is charged, the rechargeable battery 50 supplies power to the lamp source 60, so that the light source 60 can generate light and be able to emit through the housing 10. In the utility model, the housing 10 may be a transparent housing as a whole, it is also possible that the portion facing the light source 60 is a transparent housing.

Since the opening of the USB charging interface 30 is located on the surface of the housing 10 of the lamp 1. When the lamp 1 is operated underwater, the water flows into the opening of the USB charging interface 30. If there is a gap between the USB charging interface 30 and the circuit board 20, The opening of the USB charging interface 30 penetrates the gap and causes the circuit board 20 inside the lamp 1 to be short-circuited so that the lamp 1 can not provide illumination and affect underwater operations.

Therefore, referring to FIG. 3, the utility model is filled with the conductive sealant 40 in the gap between the USB charging interface 30 and the circuit board 20. The presence of the conductive sealant 40 not only eliminates the gap between the USB charging interface 30 and the circuit board 20 but also does not affect the electrical connection between the USB charging interface 30 and the circuit board 20 so that water cannot penetrate into the circuit board 20, The risk of the circuit board 20 is short-circuited, and the waterproof performance of the USB charging interface 30 of the lamp 1 is improved.

It is to be noted that, in the present embodiment, the specific type of the conductive sealant 40 is not limited as long as the conductive sealant has electrical conductivity and is capable of thermal expansion and contraction. For example, a hot melt adhesive may be used as the conductive sealant, and a conductive medium may be added to the hot melt to impart electrical conductivity to the hot melt adhesive. At the initial assembly, the conductive sealant 40 is not fully cured and is in a molten state, and the USB charging interface 30 and the circuit board 20 are generally assembled by a welding process. The heat generated by the welding process causes the conductive sealant 40 to expand and the conductive sealant 40 in the molten state is free from the gap between the USB charging interface 30 and the circuit board 20 and filled with the gap.

After the assembly is completed, the conductive sealant 40 is cooled and solidified, and the conductive sealant 40 in FIG. 1 is in a cured state. Referring to FIG. 3, the conductive sealant 40 is bonded to the USB charging interface 30 and the circuit board 20, respectively, and the cured The conductive sealant 40 wraps the USB charging interface 30 facing the portion of the circuit board 20 so that the conductive sealant 40 eliminates the gap between the USB charging interface 30 and the circuit board 20 and effectively prevents water from passing between the USB charging interface 30 and the circuit board 20 Of the gap into the interior of the lamp 1.

Even when there is a gap between the USB charging interface 30 of the lamp 1 and the housing 10 of the lamp 1, the conductive sealant can also be released to this and fill the gap. Thus, the use of the conductive sealant 40 of the lamp 1 of the utility model can effectively improve the waterproof performance of the lamp 1.

In particular, referring to FIG. 2 and in conjunction with FIG. 3, the USB charging interface 30 of the utility model has a rectangular shape, the USB charging interface 30 has a first surface 31 facing the circuit board 20, the first surface 31 has an axial clearance with the circuit board 20, the "axial" in the utility model is shown in the direction X in FIG. 1, a conductive sealant 40 is filled in the axial gap.

In addition, with continued reference to FIG. 3, the USB charging interface 30 also has a plurality of second surfaces 32, the second surface 32 is disposed about the first surface 31, and extends in a direction away from the circuit board 20, the first surface 31 is located between the circuit board 20 and the second surface 32. As shown in FIG. 3 equivalent to, the second surface 32 of the utility model USB charging interface 30 is provided along the radial direction of the USB charging interface 30 (shown in the Y direction in FIG. 1). The second surface 32 has a radial gap with the housing 10 of the lamp 1, the conductive sealant 40 is also filled in the radial gap. Thereby, the USB charging interface 30 is axially spaced from the circuit board 20, and the gap between the radial direction and the housing 10 is filled with the conductive sealant 40, the waterproof performance of the USB charging interface 30 is further improved.

In addition, with continued reference to FIG. 3, the USB charging interface 30 has a pin 33 provided on the first surface 31, the circuit board 20 is provided with a first insertion hole 21 for inserting the pin 33, the number of the first jacks 21 and the number of the pins 33 coincide, and the position corresponds. In connection with FIG. 3, the pin 33 on the USB charging interface 30 is inserted into the first receptacle 21 on the circuit board 20, to be electrically connected to the circuit board 20; simultaneously, the conductive sealant 40 wraps the pin 33 on the USB charging interface 30.

The purpose of this arrangement is that the pin 33 on the USB charging interface 30 is electrically connected to the circuit board 20 along the axial end of the USB charging interface 30 and the other end to the USB charging interface 30 in the opening on the surface of the housing 10. The other end of the pin 33 is exposed to the outer chamber 1a (as shown in FIG. 1) of the housing 10 and the pin 33 is enclosed in the body of the USB charging interface 30 due to machining tolerances, the pin 33 is connected to the USB charging interface 30 The body has a gap in the radial direction. The outside water may penetrate the circuit board 20 from the gap through the lead 33.

Therefore, the pin 33 on the USB charging interface 30 is wrapped by the conductive sealant 40, the conductive sealant 40 may be filled into the gap in the radial direction of the body of the pin 33 and the USB charging interface 30, thereby preventing the outside water from penetrating from the gap into the circuit board 20, the waterproof performance of the USB charging interface 30 is further improved.

At the same time, a pin 34 is also provided on the first surface 31 of the USB charging interface 30, a second jack 22 for inserting the pin 34 is provided at a corresponding position of the circuit board 20, the number of the second jacks 22 coincides with the number of the pins 34. The number of the pins 34 is not limited, one pin 34 is shown in FIG. 2, correspondingly, the circuit board 20 is provided with one second jack 22. The USB charging interface 30 is inserted into the second jack 22 through the pin 34, the USB charging interface 30 can be positioned in the radial direction, preventing the USB charging interface 30 from rocking in the radial direction, resulting in radial clearance, causing water to penetrate the circuit board 20 from the gap, the waterproof performance of the USB charging interface 30 is further improved.

Lightfill Aspects:

In order to make the above-mentioned objects, features and advantages of the utility model more easily understood, specific embodiments of the utility model will be described in detail with reference to the accompanying drawings.

Figure 4:
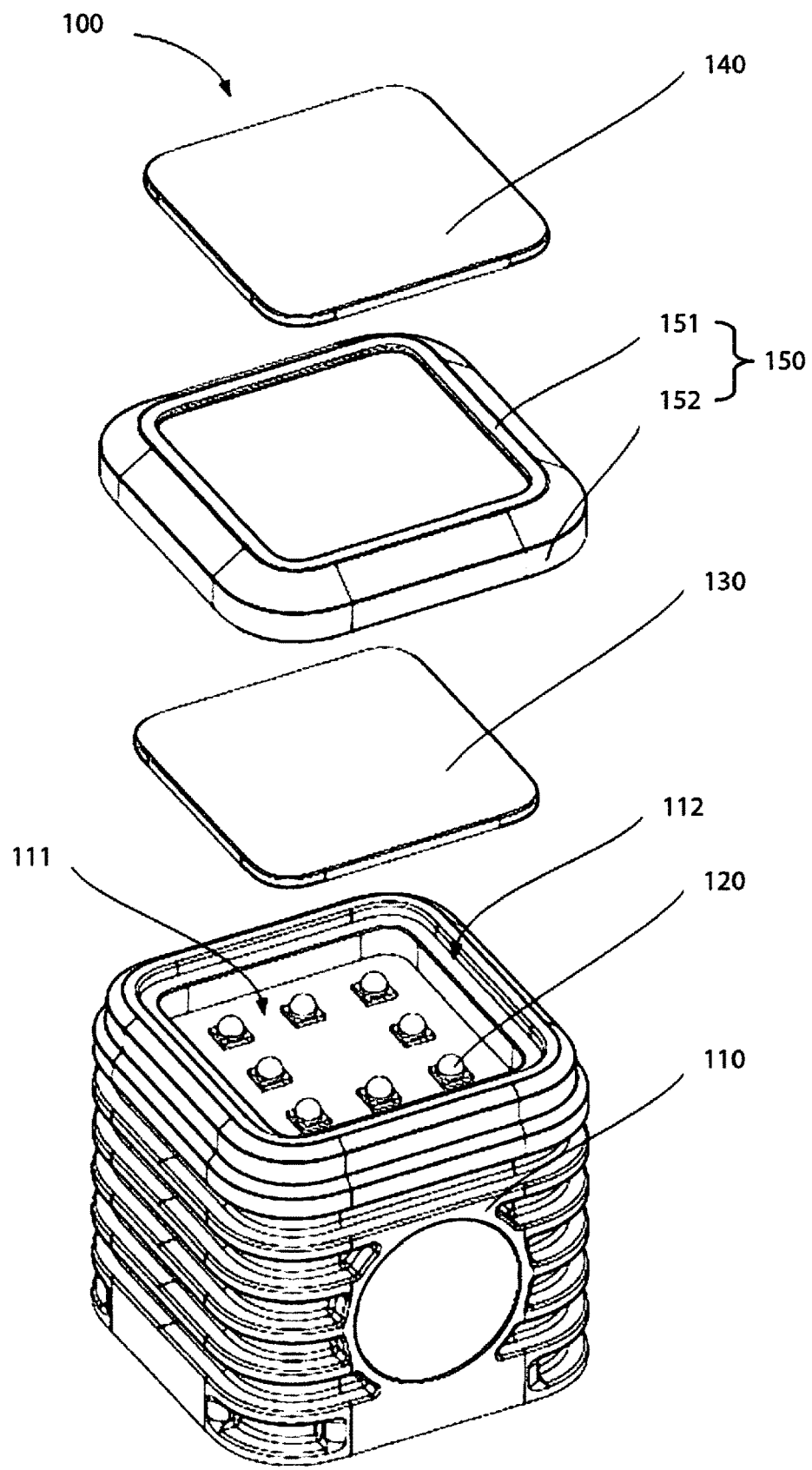
FIG. 4 is an exploded view of another specific light-filling embodiment of the embodied lighting assembly.
Figure 5:
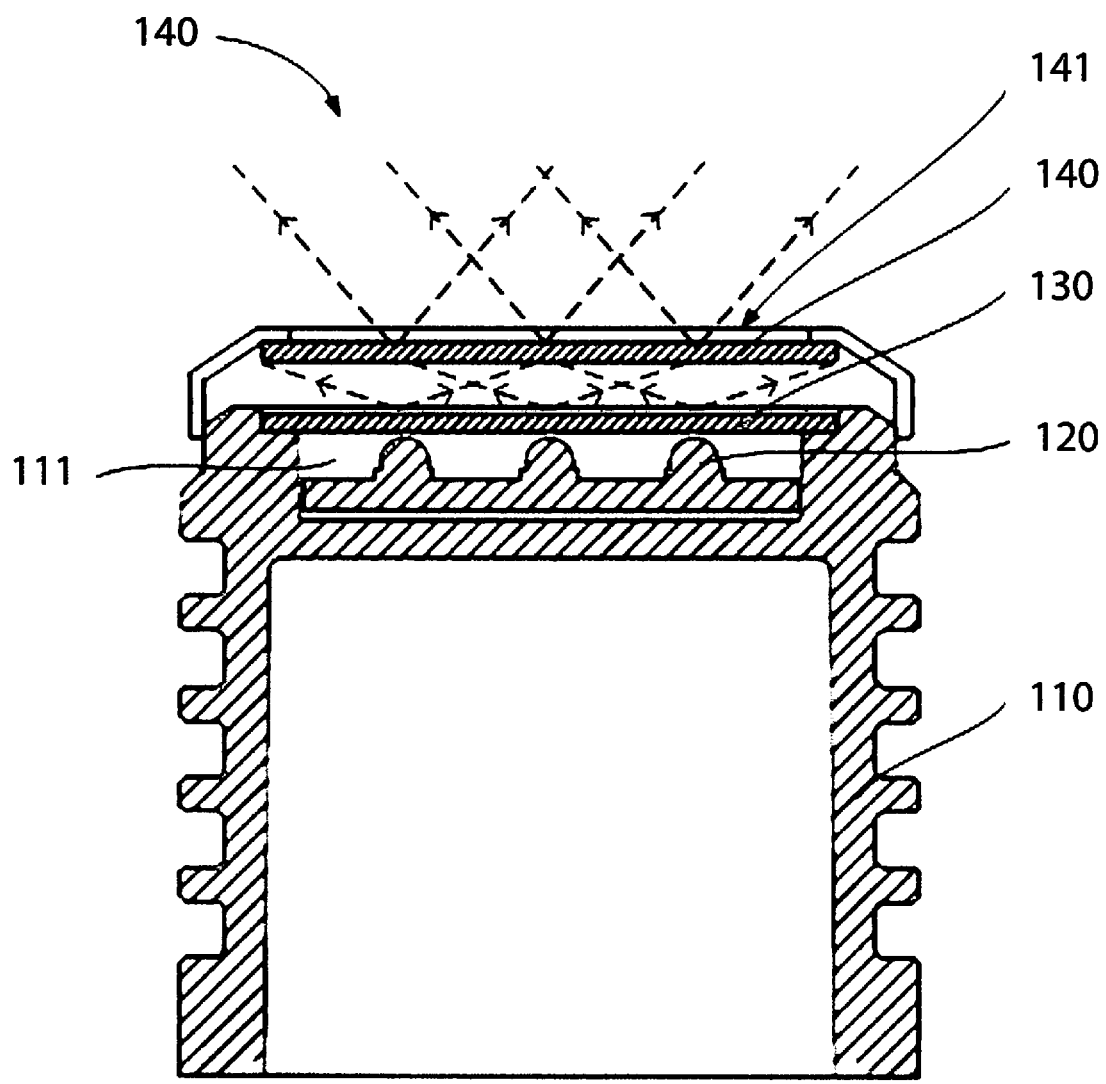
FIG. 5 is an axial cross-sectional view of the specific light-filling embodiment of the embodied lighting assembly passing through a central axis.
Figure 6:
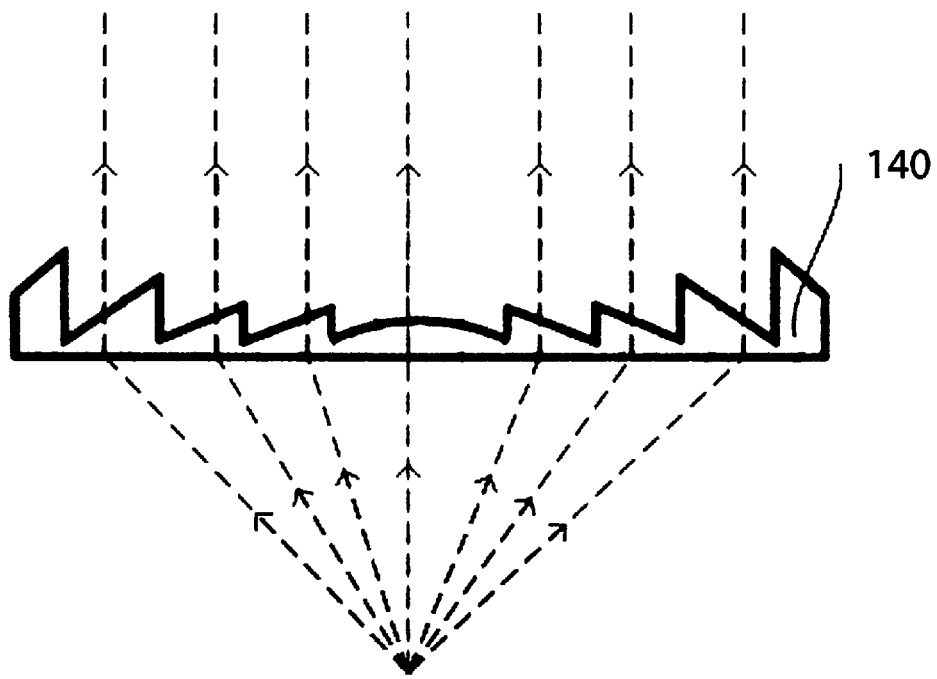
FIG. 6 is a schematic view of a structure of an embodied Fresnel lens in a specific light-filling embodiment of the embodied lighting assembly.

Referring to FIGS. 4-6 another embodied lamp 100 is featured, a lamp 100 for a photographic camera device, including the lamp housing 110, the light housing 110 is fixedly provided with a light emitting member 120, a circuit which is turned on with the light emitting member 120, when the circuit is energized, the light emitting member 120 can emit light for illuminating and enhancing the brightness of the object to be irradiated.

The lamp 100 also includes a diffuser 130, the diffuser 130 is disposed opposite to the light emitting member 120, so that the light emitted from the light-emitting member 120 can be irradiated to the outside through the diffuser 130. The diffuser 130 is generally made of transparent glass or transparent plastic, and etching the trench on its surface, so that the surface of the diffuser 130 is uneven. When the light is irradiated to the diffuser 130, the light is scattered in different directions, it is possible to convert the linear light emitted from the light emitting member 120 into soft diffused light, so that the light spot on the object to be irradiated can be eliminated, so that the photographs taken, image is more natural.

In the present embodiment, the lamp 100 further includes a condenser lens 140. Light emitted from the light-emitting member 120 is sequentially passed through the diffuser 130, and the condenser lens 140 to radiate to the outside world.

Referring to FIG. 5, the light emitted from the light emitting member 120 is scattered by the diffuser 130, the light is fired at different angles, which will lead to a waste of light outside the shooting angle. The condenser lens 140 functions to collect light, the light passing through the condenser lens 140 is collected in a certain area. At this time, if the area to be photographed is located in the area where the light is collected, it can effectively increase the brightness of the object, to achieve better lighting; and, because the light is pooled, the shooting angle outside the light is less, which results in a more effective use of light, and will not lead to a waste of light outside the shooting angle.

Specifically, the light-emitting member 120 in the present embodiment is an LED lamp bead, and the LED lamp beads are plural and are located on the same plane, and the LED lamp beads emit light to form a light-emitting surface to realize illumination. In other embodiments, the light emitting member 120 may also be other light emitting lamps such as fluorescent lamps.

The condenser lens 140 may be a convex lens or a Fresnel lens may be selected.

In a presented embodiment, the condenser lens 140 is a Fresnel lens. Specifically, as shown in FIG. 6, the Fresnel lens is generally made of glass or plastic, one of which is smooth and the other is a texture plane with a plurality of concentric circles of different sizes. Light from the light into the general, the texture of the surface shot, play a role in the collection of light. Compared to an ordinary convex lens, Fresnel lens can play the same role in the premise of reducing a lot of material, thereby reducing costs.

With continued reference to FIG. 5, the lamp 100 also includes a protective lens 141, the protective lens 141 is fixedly provided on the condenser 140 having a textured side, and protects the condenser lens 140. The condenser lens 140 and the diffuser 130 form a first sealed cavity. Since the condenser lens 140 (e.g., Fresnel lens) has a textured side with a depression and a raised surface, in the depressions dust and other impurities eaily collectand thus affect the light injection, and reduce the intensity of the emitted light. Therefore the protective lens 141 serves to prevent the accumulation of impurities such as dust in the depression of the Fresnel lens, and affecting the light.

In further embodiments, an antireflective film (not shown) is coated on the smooth surface of the Fresnel lens, and the antireflection film may be used to increase the intensity of the transmitted light within the light. When the light is incident on the surface of the optical element, the reflected light and the transmitted light are generated, and the total energy of the reflected light and the transmitted light is equal to the energy of the incident light irrespective of other factors such as absorption and scattering.

The effect of the antireflection coating is that the energy of the reflected light and the transmitted light is redistributed, and the energy of the reflected light is reduced and the energy of the transmitted light is increased. Thereby increasing the intensity of the transmitted light and enhancing the illumination effect.

In other embodiments, an antireflective film may be coated on the textured surface of the Fresnel lens, or an antireflection film may be plated on the smooth and textured surfaces of the Fresnel lens to increase the strength of the transmitted light.

With continued reference to FIGS. 4 and 5, the lamp housing 110 has a second sealing cavity 111, the second sealing cavity 111 has a wall surface through which light is transmitted, and the light emitting member 120 is fixedly disposed in the second sealing cavity 111. As shown in FIG. 5 the second sealing cavity 111 is capable of isolating the light emitting member 120 from the outside, it is possible to prevent the external impurities from adhering to the light emitting member 120, affect the luminous effect; in addition, when the lamp 100 provides illumination for underwater shooting, the second sealing cavity 111 can prevent the water from coming into contact with the light emitting member 120, thereby damaging the light emitting member 120.

In further embodiments, the wall surface in which the light can be transmitted in the second sealed cavity 111 is the diffuser 130. As shown in FIG. 4 That is, the diffuser 130 has the effect of softening the light and also has a sealing effect to isolate the light emitting member 120 from the outside.

Specifically, the second sealing cavity 111 has a bottom wall opposed to the diffuser 130, an annular side wall surrounding the bottom wall, an annular groove 112 provided on the annular side wall, and a diffuser 130 fixedly provided in the annular groove 112 inside. And the annular groove 112 penetrates axially through one end of the annular side wall, and the diffuser 130 is disposed in the annular groove 112 in a fixed manner.

In other embodiments, the wall may also be a lens for light transmission, which is provided on the exterior of the second sealing cavity for smoothing the light.

With continued reference to FIGS. 4 and 5, the lamp 100 also includes an annular support 150, the annular support 150 has a first annular end 151 along its axial direction, a second annular end portion 152, the condenser lens 140 is fixedly provided on the first annular end portion 151, the second annular end 152 is provided outside the lamp housing 110.

In particular, the second annular end 152 is detachably nested outside the lamp housing 110. That is, different types of lamps 100 can be selected according to different situations. When the condenser lens 140 needs to be used, the second annular end portion 152 is fitted outside the lamp vessel 110 so that light passes through the condenser lens 140, When the condenser lens 140 is not used, the annular support 150 is detached from the lamp housing 110, and the light is passed through only the diffuser 130 and then irradiated to the outside.

The second annular end 152 is provided outside the lamp housing 110 in such a manner that the second annular end 152 is screwed to the lamp housing 110 or the second annular end 152 is in interference fit with the lamp vessel 110.

Another embodied lighting assembly is embodied in FIGS. 7 through 12 which shows the various views and sides of an embodied lighting assembly wherein durability and utility features of the lighting assemblies are reviewed.

Figure 7:
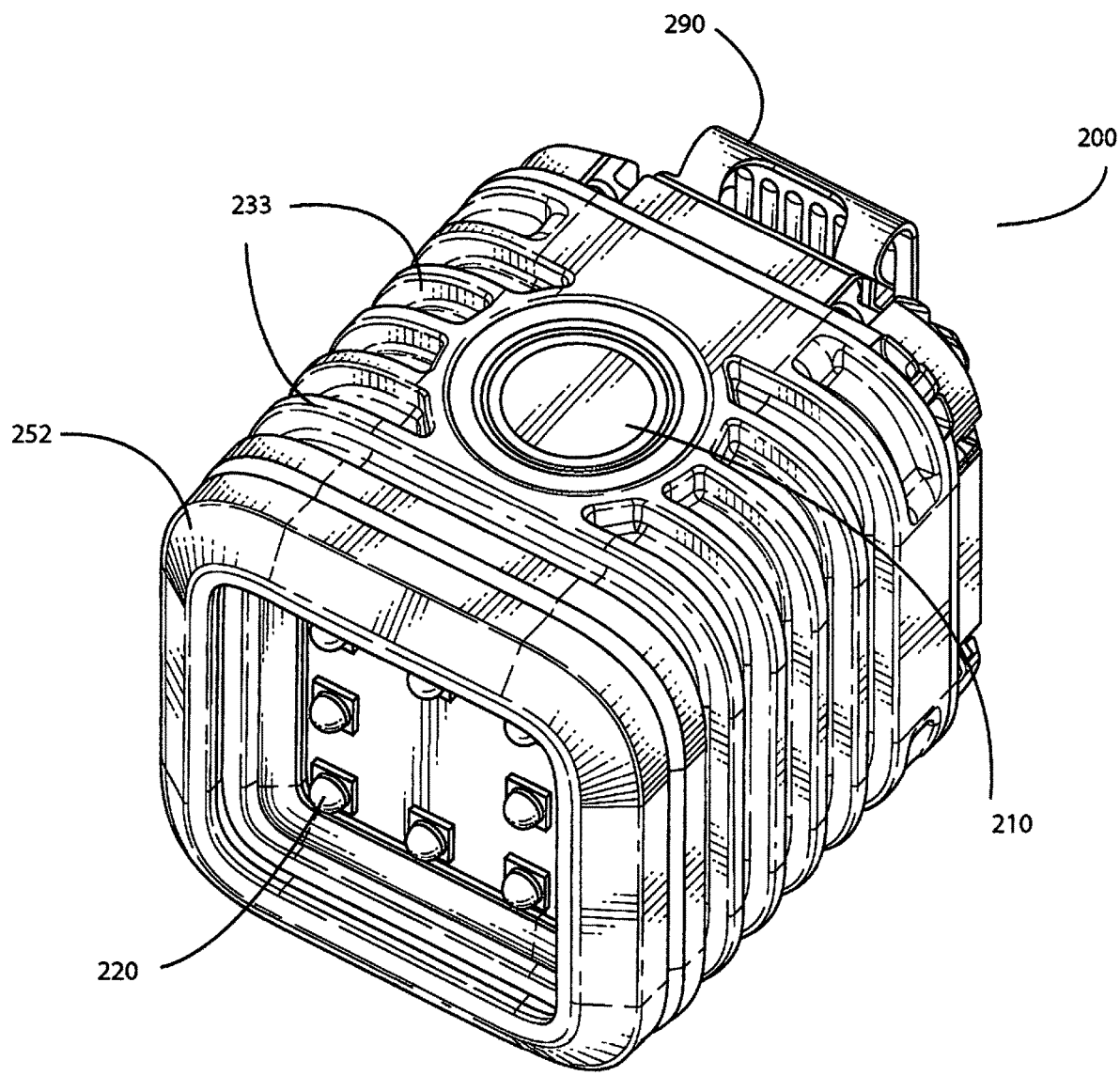
FIG. 7 shows a perspective view of an embodied lighting assembly with an attached filter assembly and clip assembly.

FIG. 7 is a front perspective view which shows an embodied light assembly 200 further comprising a sealed power on/off button 210 a plurality of LED lighting elements 220 that may be configured in various patterns and different colors. The housing of the lighting assembly further includes a plurality of thermal ridges 233. Additionally optional filter lens 252 embodiments and an attachment clip mechanism 290 are shown in this embodied light assembly.

Figure 8:
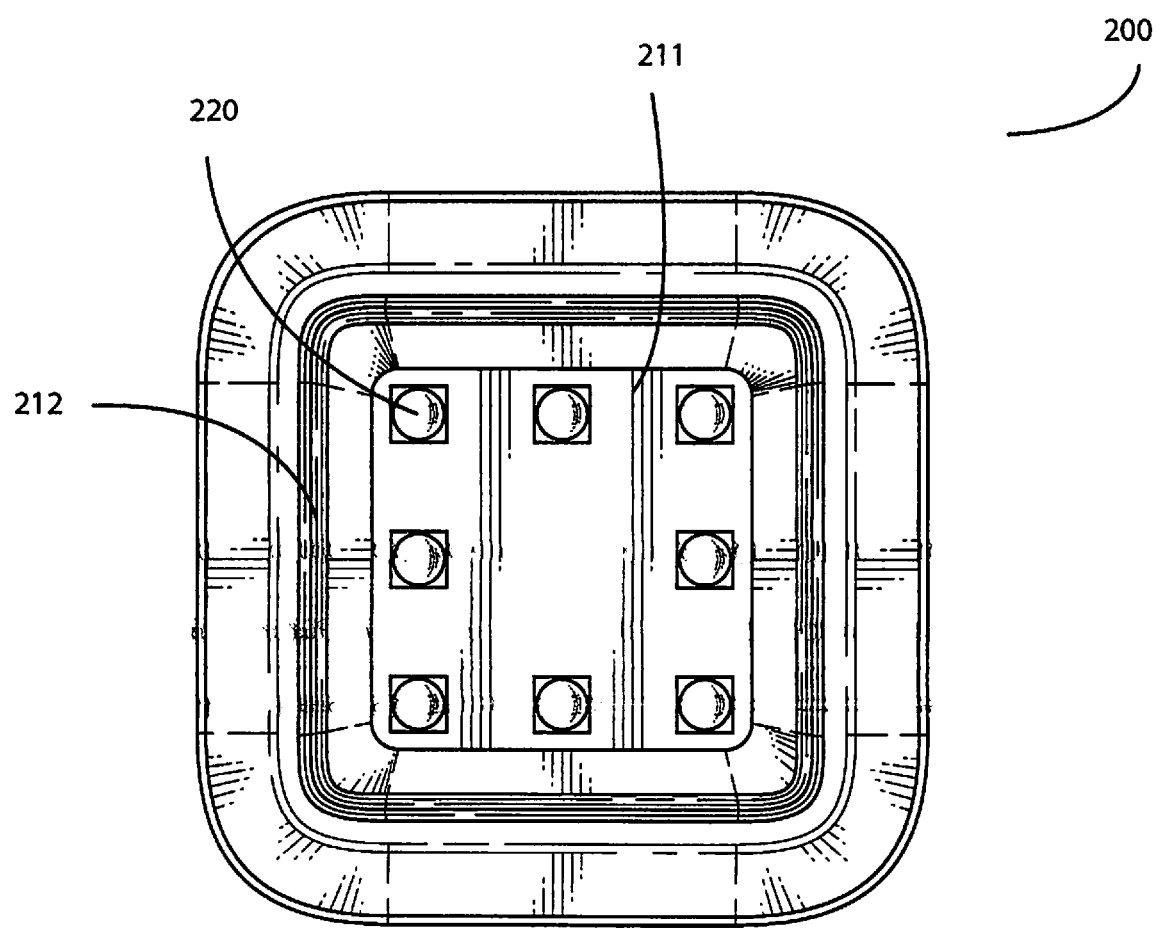
FIG. 8 shows a front view of the embodied lighting assembly of FIG. 7 wherein the assembly embodiment features 8 LED lights arranged to provide broad lighting abilities.

FIG. 8 shows a front view of the embodied lighting assembly 200 of FIG. 7 wherein the assembly embodiment features 8 LED lights 220 arranged on a surface 211 within the cavity created by the cover 212.

Figure 9:
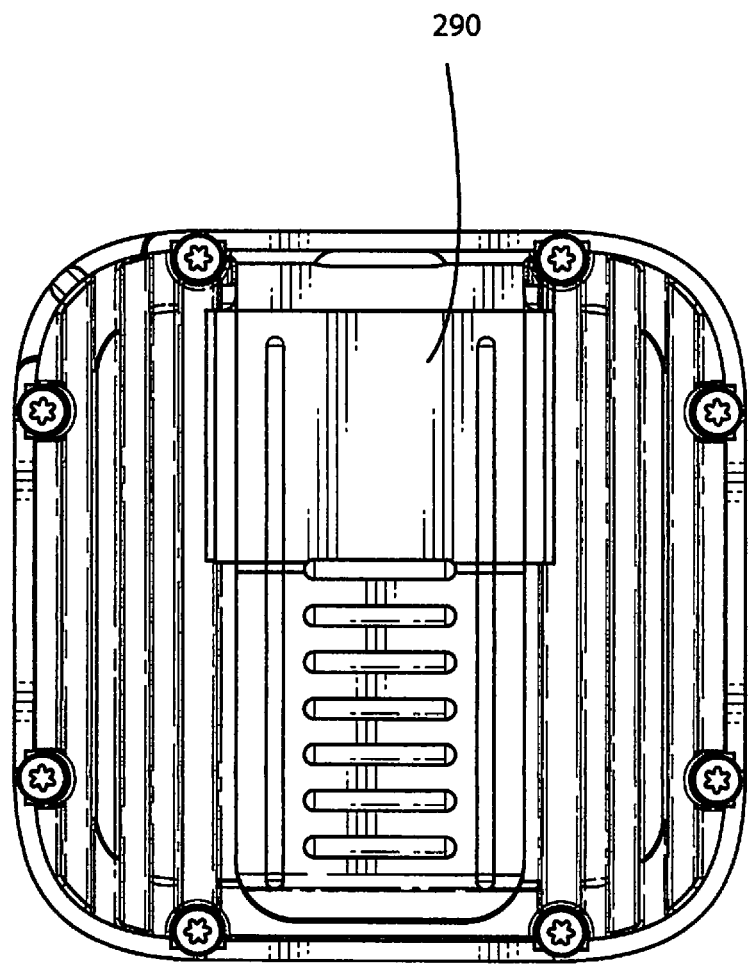
FIG. 9 shows a back view of the embodied lighting assembly of FIGS. 7 and 8 wherein an attachable clip is attached and viewable.

FIG. 9 shows a back view of the embodied lighting assembly of FIGS. 7 and 8 wherein an attachable clip 290 is attached and viewable.

Figure 10:
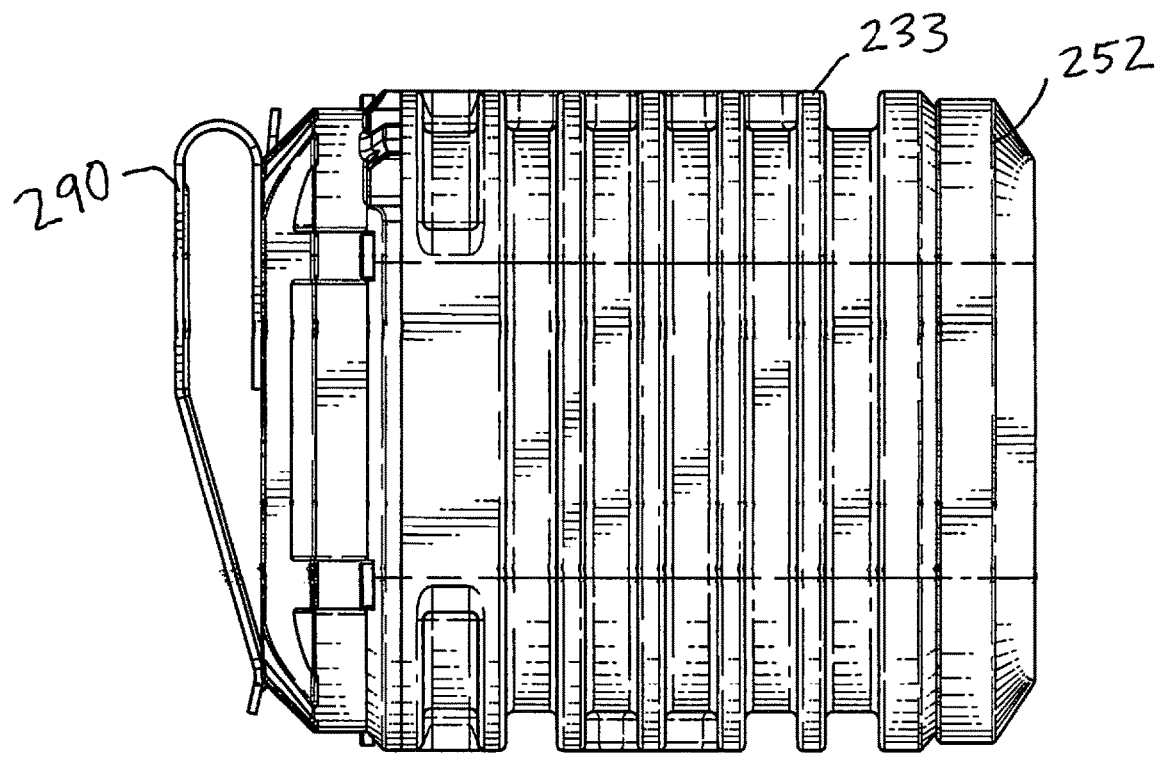
FIG. 10 consists of FIG. 10A and 10B which shows right and left side views (respectively) of the embodied lighting assembly of FIGS. 7-9 with the prominence of the heat dissipation ridges, the attachable clip and front filter in view.
Figure 10:
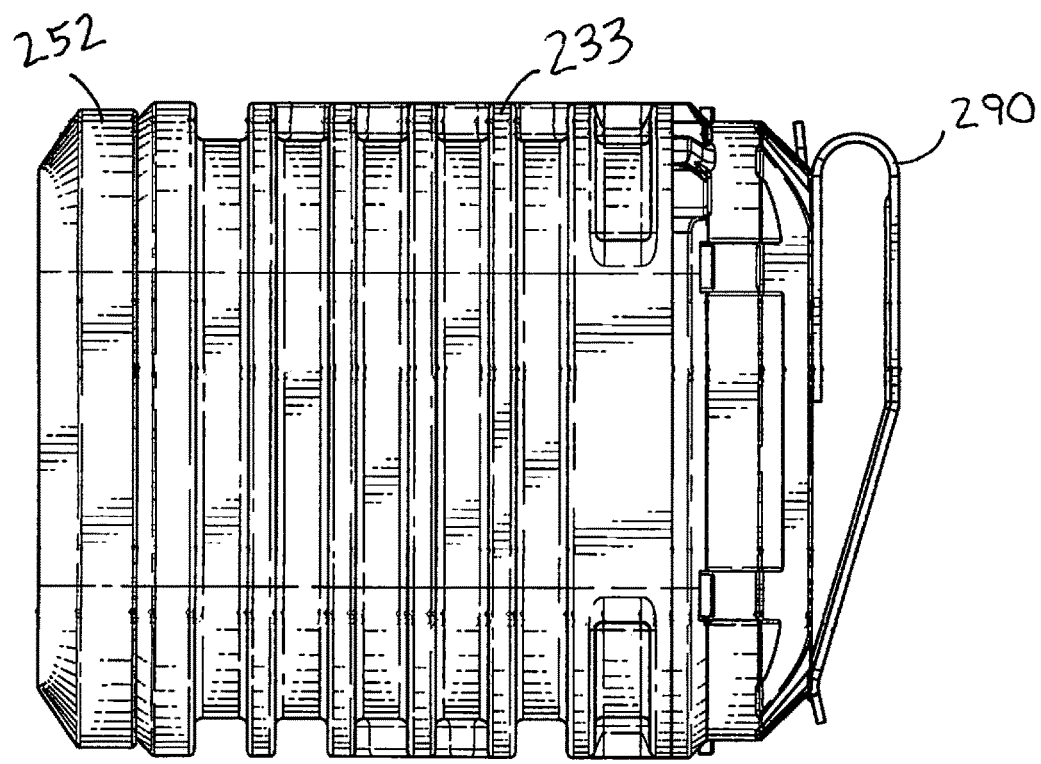

FIG. 10 consists of FIG. 10A and 10B which shows right and left side views (respectively) of the embodied lighting assembly of FIGS. 7-9 with the prominence of embodied heat dissipation ridges 230, the attachable clip 290 and front filter 252 in view.

Figure 11:
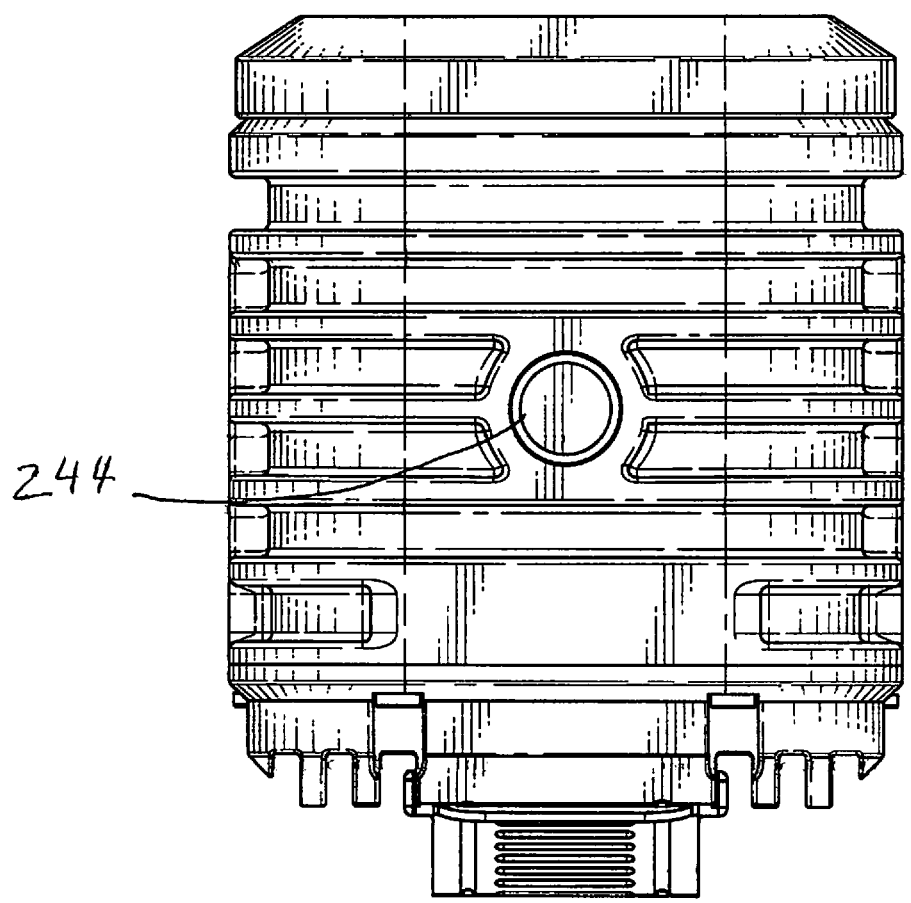
FIG. 11 shows a bottom view of the embodied lighting assembly of FIGS. 7-10 with a female portion for mounting with a male portion of a mounting apparatus featured.

FIG. 11 shows a bottom view of the embodied lighting assembly of FIGS. 7-10 with a female portion 244 for mounting with a male portion (not shown) of a mounting apparatus featured.

FIG. 12 consists of FIGS. 12A-12D wherein; FIGS. 12A and 12B shows another embodied lighting assembly 200 with multiple views and configured to be placed in a mounting cage 280 separately shown; and FIGS. 12C and 12D shows the embodied lighting assembly 200 with side and front views of the assembly 200 after being placed within a mounting cage 280 which further includes a mounting cage mounting bracket 282 which enables the cage to be secured to various frames, handlebars, surfboards, lanyards and the like.

Figure 13:
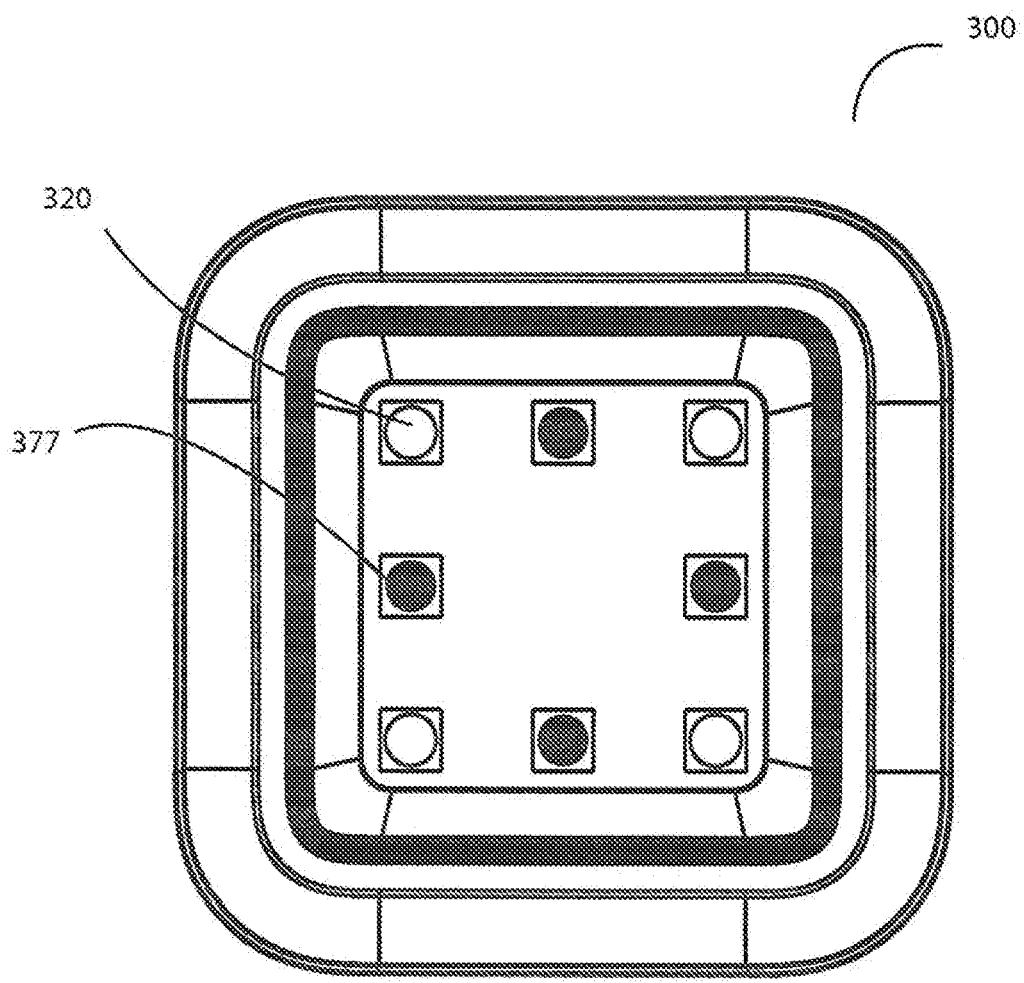
FIG. 13 shows a another embodied lighting assembly wherein the featured LED lights are varying in number and/or of different kinds or colors (colors not shown).

FIG. 13 shows another embodied lighting assembly 300 wherein the featured LED lights 320 are varying in number and/or of different kinds 377 or colors (colors not shown).

Figure 14:
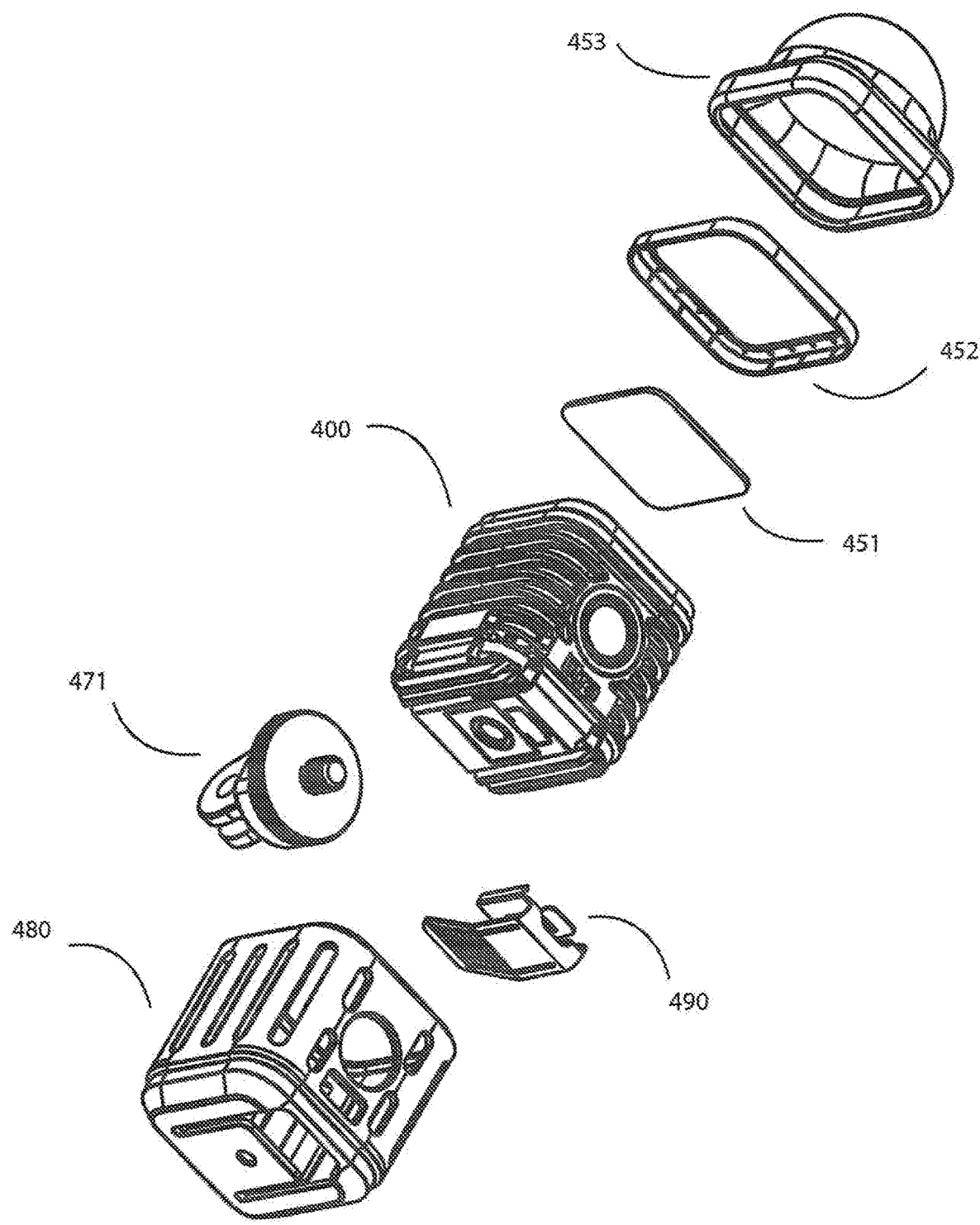
FIG. 14 shows various views of the production schematics of another embodied lighting assembly.

As shown in FIG. 14 another embodied lighting assembly 400 is shown in an exploded view engineering schematic wherein the light assembly 400 features a glare-free filter 451 another filter with or without a filter frame 452 which is finally covered with a removable light diffuser 453 for buffering and diffusing light in photographic instances. Additionally, a sleeve 480 which may be made of a silicone or other heat resistant material may be used to ease handling of the light when warm. A mounting clip 490 and mounting apparatus 471 may also be featured.

Recharge Aspects

In view of the above-mentioned problems, an embodiment of the present invention provides a control method for a portable lamp, when an external power source is connected to a portable lamp and an illumination control command is detected, adjusting the operating current of the portable lamp, such that the rechargeable battery is always in a charged state, so that it is possible to avoid the repeated switching of the charge/discharge state of the rechargeable battery, reduce the number of rechargeable battery charge and discharge, it can improve the life of rechargeable batteries.

Hereinafter, specific embodiments of the present invention will be described in detail with reference to the accompanying drawings.

Referring to FIGS. 15-18, the embodiments of the present invention provides for recharging control methods and circuitry for an embodied portable lamp/lighting apparatus.

First, in order to enable a person skilled in the art to better understand the control method, the portable lamp is described as follows: The portable lamp is provided with a rechargeable battery. By providing an external power supply to the charging port provided on the surface of the portable lamp, on the one hand can provide portable lighting for the working current, on the other hand, the rechargeable battery may be charged.

In a specific implementation, the control method may comprise the steps of:

Detecting whether or not the portable lamp is an external power source.

In a particular implementation, a variety of methods may be used to detect whether the portable lamp is an external power source, for example, it is possible to detect whether the current input to the portable lamp charging port is greater than zero. When the input current of the portable lamp charging port is greater than 0, the external power source of the portable lamp is determined, otherwise it is determined that the portable lamp has no external power supply.

Among them, the external power supply may be a charging pod, Electricity, etc., The charging port of the portable lamp surface may be a USB port or the like. When the portable lamp is connected to the external power source and the lighting control command is detected, the operating current of the lighting circuit is adjusted, and simultaneously detecting the current state of said rechargeable battery, to keep the rechargeable battery in a fully charged state.

In the specific implementation, the lighting control instructions may be input in a variety of ways, specifically without limitation. For example, the portable lamp may be provided with a touch interface, and inputting the lighting control command through the touch interface. The portable lamp may also be provided with a corresponding key plate, and inputting the lighting control command through a key on the key sheet. The portable lamp may also be provided with a corresponding radio, such as a microphone, and inputting a lighting control instruction in the form of a voice through said radio. The portable lamp may also be bound to a control terminal such as a mobile phone, the lighting control instructions are input by remote control.

In the specific implementation, when the portable lamp is connected to the external power source and the lighting control command is detected, the operating current of the portable lamp can be reduced. Due to portable lamps when the external power supply input current, part of the work as a portable lamp current, The other part as the rechargeable battery charging current, so in the external power input to the portable lamp current is certain circumstances, reducing the operating current of the portable lamp can increase the charging current of the rechargeable battery, whereby the rechargeable battery can be maintained in a charged state, to avoid the rechargeable battery charge and discharge state of the switch, reduce the number of rechargeable battery charge and discharge, it can improve the life of rechargeable batteries. Of course, when the charge current of the rechargeable battery reaches the preset current value, it is also possible to increase the operating current of the portable lamp, as long as the rechargeable battery can be maintained in the state of charge.

In a particular implementation, the current state of the rechargeable battery may be detected in a variety of ways. In an embodiment of the present invention, the battery state detection circuit may be used to detect the current state of the rechargeable battery. Further, in order to more accurately detect the current state of the rechargeable battery, the battery state detection circuit may be used to detect the charging current and the discharge current of the rechargeable battery, further, based on the detected charging current and the discharge current, determining the current state of the rechargeable battery.

For example, when the charging current of the rechargeable battery is greater than 0, it is determined that the rechargeable battery is in a charged state. And when said discharge current of said rechargeable battery is greater than zero, it is determined that said rechargeable battery is in a discharged state.

In a specific embodiment, the rechargeable battery may be a nickel-cadmium battery, or may be a nickel-hydrogen battery, a lithium ion battery, a lead-acid battery, or an iron-lithium battery, and may be specifically provided according to the practical needs of the portable lamp.

In the specific implementation, the portable lamp may be any kind of lamp such as a flashlight, a lamp, and the like. It is to be understood that what particular portable lamps are intended for use in the fixture are not to be construed as limiting the invention and are within the scope of the invention.

As can be seen from the above, the control method of the portable lamp according to the embodiment of the present invention can adjust the operating current of the portable lamp by enabling the rechargeable battery to be maintained at the time of charging the portable lighting device and detecting the lighting control command State, which can improve the life of rechargeable batteries.

In order that the person skilled in the art will better understand and practice the invention, the portable lamp corresponding to the control method of the portable lamp will be described in detail below.

Referring to the circuit configuration diagram of the portable lamp shown in FIGS. 15-18, the circuit structure of the portable lamp may specifically include the following components:

Rechargeable battery 721;

Lighting circuit 722; An input circuit SW1 adapted to input an illumination control command; a current regulating circuit 723 adapted to adjust the operating current of the lighting circuit 722, a battery state detection circuit 724 adapted to detect the current state of the rechargeable battery 721.

Control circuit U3, when the portable lamp is adapted to an external power source and an illumination control command is detected, controls the current regulating circuit 723 to adjust the operating current of the lighting circuit, and simultaneously controls the battery state detection circuit 724 to detect the current state of the rechargeable battery, to keep the rechargeable battery in a fully charged state.

In the specific implementation, the portable port of the portable lamp can be a USB interface, it can also be for other types of interfaces. Take the USB interface as a portable lamp charging port as an example, the control circuit U3 may be coupled to the USB interface via a resistor R14, by detecting whether the voltage value of the resistor R14 and the resistor R15 intermediate node USB sense reaches the preset first voltage value, you can determine whether the portable lights are external power supply.

In a specific implementation, the portable lamp may also include a first voltage conversion circuit U1 and a second voltage conversion circuit. Wherein the input terminal of the first voltage conversion circuit U1 may be coupled with the USB interface, the output terminal is coupled with the transistor Q3 and the sampling resistor Rcs, suitable for the USB interface input voltage for voltage conversion, A voltage suitable for operation of the transistor Q3 and the rechargeable battery 721 is obtained. For example, USB interface input power supply voltage can be 5V, after the voltage conversion by the first voltage conversion circuit U1, you can get between 3.7V-4.2V voltage. The first voltage conversion circuit U1 provides a charge voltage to the rechargeable battery 721 via the resistor Rcs on the one hand, on the one hand, the power supply voltage VCC is supplied to the control circuit U3 and the illumination circuit 722 via the transistor Q3.

The input terminal of the second voltage conversion circuit is coupled with the output end of the first voltage conversion circuit U1, the output terminal is coupled to the current regulating circuit 723, under the control of the enable signal EN for the output of the control circuit U3, the voltage after the conversion of the first voltage conversion circuit U1 is subjected to further voltage conversion, an operating voltage suitable for the operation of the lighting circuit 722 is obtained, and is maintained at a preset second voltage value. For example, when the output voltage of the first voltage conversion circuit U1 is 3.7 V, after conversion by the second voltage conversion circuit U2, can get a stable 6V voltage.

In particular, the second voltage conversion circuit may include a voltage conversion sub-circuit U2 and a stabilization sub-circuit. The regulator circuit may include an inductance L1, a diode D3, a resistor R3, a resistor R4, a capacitor C3, and a capacitor C4. Wherein the inductance L1 is connected in parallel with the voltage conversion sub-circuit U2, the resistor R3 is connected in parallel with the capacitor C, and the resistor R3 is connected in series with the resistor R4 in parallel with the capacitor C4. The diode D3 is coupled between the inductor L1 and the resistor R3. The resistor R3 is connected to the FB pin of the voltage conversion sub-circuit U2 and is adapted to couple the voltage conversion sub-circuit U2 to the voltage conversion sub-circuit U2.

In the specific implementation, the current regulating circuit 723 may include an NMOS transistor Q1 coupled to the lighting circuit 722 and the second voltage conversion circuit, an NMOS transistor Q2 coupled to the second voltage conversion circuit, a resistor R6 coupled between the gate of the NMOS transistor Q1 and the drain of the NMOS transistor Q2, a capacitor C2 coupled between the gate and the ground of the NMOS transistor Q1, the gate of the NMOS transistor Q2 is coupled to the control circuit U3, the source of the NMOS transistor Q1 is grounded through the resistor RS. The drive signal DRV output from the control circuit U3 via the resistor R5, and the pulse width of the NMOS transistor Q2 is adjusted by the drive signal DRV, thereby changing the drain current of the NMOS transistor Q1. Since the illumination circuit 722 is connected in series with the NMOS transistor Q 1, the drain current of the NMOS transistor Q1 is changed, it is equivalent to changing the operating current of the lighting circuit 722, it is possible to achieve the purpose of adjusting the operating current of the lighting circuit 722.

In the specific implementation, The portable lamp may further include a current detection circuit 725, is adapted to detect the operating current of the lighting circuit 722 and inputs the detection result to the pin CC of the control circuit U3. In particular, the current detection circuit 725 may include an operational amplifier U4, a resistor R7, a resistor R8, and a resistor R9. Wherein the non-inverting input terminal of the operational amplifier U4 is coupled to the source of the NMOS transistor Q1 through the resistor R7, the negative phase input is coupled to the ground via resistor R8. The resistor R9 is coupled between the negative phase input terminal and the output terminal of the operational amplifier U4. By detecting the voltage difference across the resistor RS to enlarge, the amplified result is input to the control circuit U3, the control circuit U3 can thereby know the operating current of the lighting circuit 722.

In the specific implementation,

The lighting circuit 722 passes through two quadruple terminals CON3 and CON4 which can be coupled, and the second voltage conversion circuit U2, the current detection circuit 725 and the control circuit U3 are coupled. In an embodiment of the present invention, quadruple connector CON3 pin 4 and pin 3 can be connected in series with thermistor NTC, the first pin of the quadrupole connector CON4 is coupled to the NTC AD pin of the control circuit U3, the operating temperature of the illumination circuit 722 can be detected by the varistor NTC.

In an embodiment of the present invention, the illumination circuit 722 is composed of four parallel LED lamp sets, each of which includes two series LED lamps, specifically the LED lamps D2 to D4, D8 to D12.

In a specific implementation, the input circuit SW1 is coupled to the control circuit U3 by two five-legged connectors CON1 and CON2 which can be coupled. Wherein the input circuit SW1 may be a touch interface, inputting the lighting control command through the touch interface unit;

can also be the corresponding keypad, the user can press the number of keys, strength, etc., enter a different lighting control instructions; can also be the corresponding voice unit, such as a microphone, and inputting a lighting control instruction in the form of a voice through said voice unit. In the specific implementation, the input circuit SW1 may also be a remote command receiving unit, and the portable lamp is bound to a control terminal such as a mobile phone through the remote command receiving unit, the lighting control instructions are input by remote control.

In an embodiment of the present invention, the portable lamp may further include an indication circuit 726 for indicating the current state of the rechargeable battery 721. For example, the indicating circuit may be provided with two LED lamps R (Red LED) and Y (Yellow LED) on the key sheet, and the LED or the like is coupled to the control circuit U3 through the five-legged connectors CON1 and CON2. After the control circuit U3 acquires the current state of the rechargeable battery 721, it can be instructed by controlling the LED lamp.

In an embodiment of the present invention, the battery state detection circuit 724 is adapted to detect a charge current Charge AD and a discharge current Discharge AD of the rechargeable battery 721 and to input a detection result to a corresponding pin of the control circuit U3, The current state of the rechargeable battery 721 is determined by the control circuit U3 based on the detection result.

Figure 15:
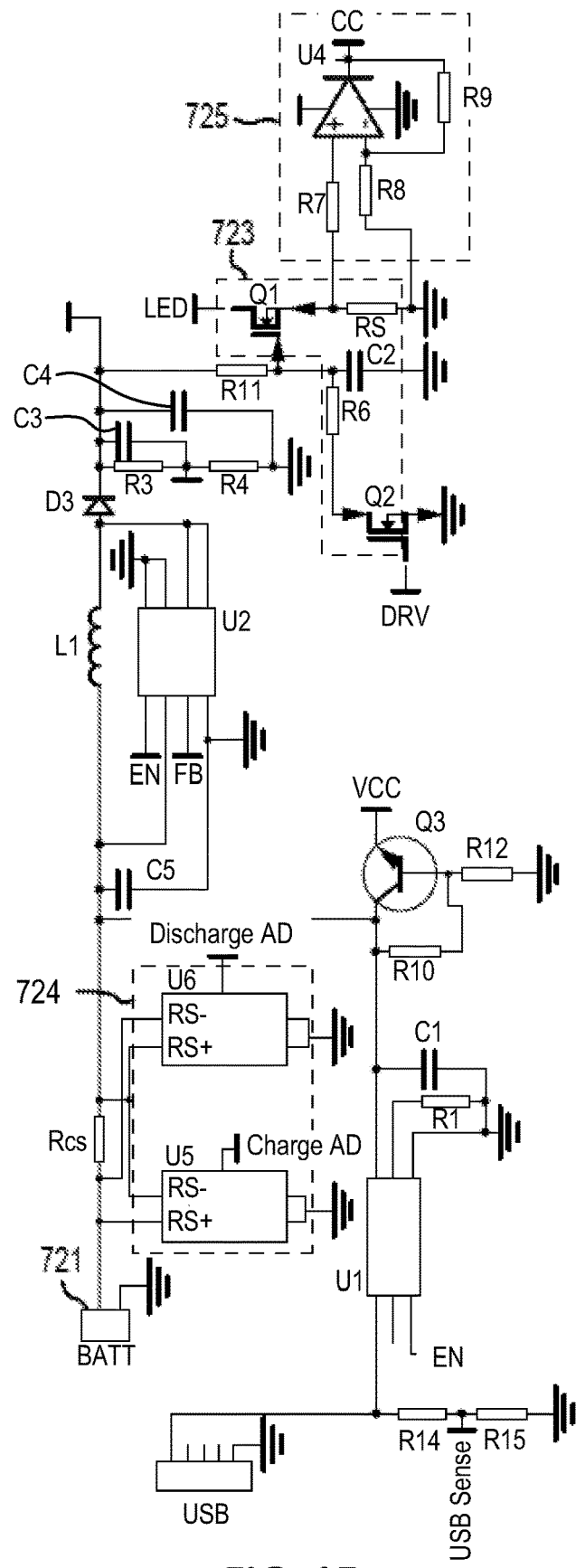
FIG. 15 shows a recharging circuity for a lighting apparatus.
Figure 16:
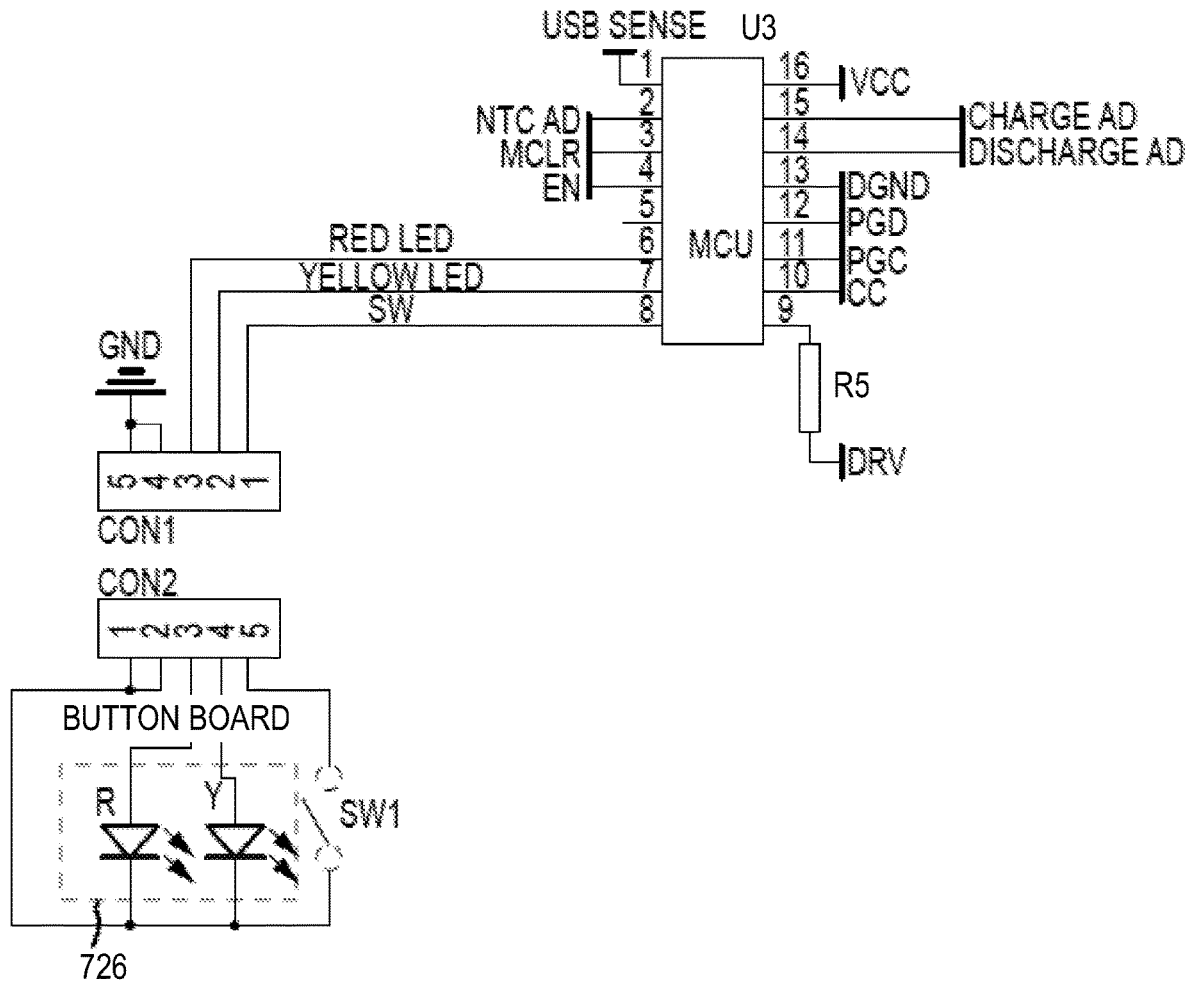
FIG. 16 shows a recharging circuity for a lighting apparatus.
Figure 17:
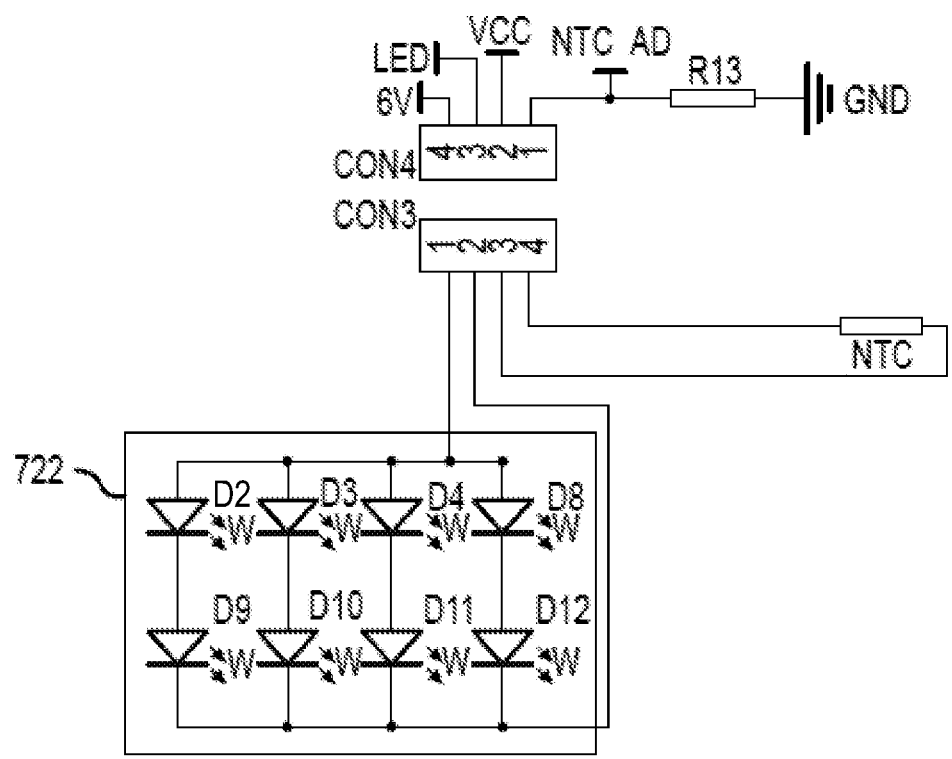
FIG. 17 shows a recharging circuity for a lighting apparatus.

In the specific implementation, referring to FIG. 15, the battery state detection circuit 724 may include a first detection sub-circuit U5 and a second detection sub-circuit U6. Wherein the first detection sub-circuit U5 is adapted to detect a charging current of the rechargeable battery 721, the second detection sub-circuit U6 is adapted to detect a discharge current of the rechargeable battery 721.

When the charge current Charge AD > 0 of the rechargeable battery 721 is controlled by the control circuit U3, it is determined that the rechargeable battery 721 is in a charged state, when the discharge current Discharge AD<0 of the rechargeable battery 721, it is determined that the rechargeable battery 721 is in a discharge state.

Figure 18:
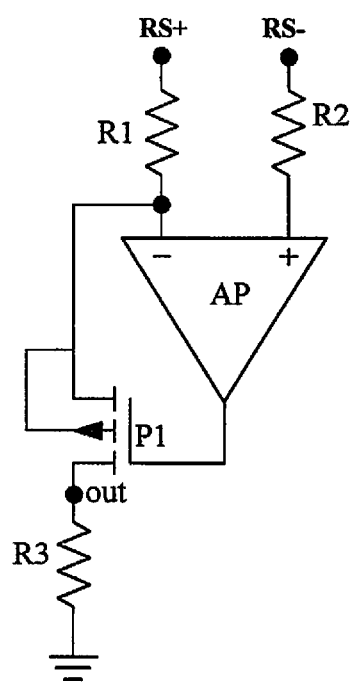
FIG. 18 shows a recharging circuity for a lighting apparatus.

In the specific implementation, referring to FIGS. 15 and 18, the first detection sub-circuit U5 and the second detection sub-circuit U6 may have a plurality of circuit configurations, specifically without limitation. In an embodiment of the present invention, the first detection sub-circuit U5 and the second detection sub-circuit U6 have the same structure, and may include a first resistor R1, a second resistor R2, an amplifier AP, a PMOS transistor P1, and a third resistor R3, wherein: the first resistor R1 is coupled to the negative input terminal of the amplifier AP and the source of the PMOS transistor P1. The second resistor R2 is coupled to the positive input terminal of the amplifier AP. The output of the amplifier AP is coupled to the gate of the PMOS transistor P1. The source of the PMOS tube P1 is coupled to the substrate, the drain is grounded via the third resistor R3. The first resistor R1 has the same resistance as the second resistor R2.

In the specific implementation, Referring to FIGS. 15 and 18, the charging current of the rechargeable battery 721 is input to the rechargeable battery 721 via the sampling resistor Rcs, the discharge current of the rechargeable battery 721 is supplied to the illumination 722 via the sampling resistor Rcs.

Specifically, in the first detection sub-circuit U5, The RS-terminal of the first resistor R1 is coupled to the first terminal k of the sampling resistor Rcs, the RS+terminal of the second resistor R2 is coupled to the second terminal m of the sampling resistor Rcs. In the second detection sub-circuit 252, the RS+terminal of the first resistor R1 is coupled to the second terminal m of the sampling resistor Rcs, the RS-terminal of the second resistor R2 is coupled to the first terminal k of the sampling resistor Rcs.

The first detection sub-circuit U5 and the second detection sub-circuit U6 may amplify the voltage difference across the sampling resistor Rcs. When the rechargeable battery 721 is discharged, the PMOS transistor P1 of the first detection sub-circuit U5 is turned on, output discharge current Discharge AD=(V1*R1)/(Rcs*R3), where V1 is the voltage at the output terminal of the first detection sub-circuit 251. When the rechargeable battery 721 is charged, the PMOS transistor P1 of the second detection sub-circuit U6 is turned on, output Charge Current Charge Charge AD=(V2*R1)/(Rcs*R3), where V2 is the voltage of the output terminal out of the second detection sub-circuit 252.

In the specific implementation, it can be based on the actual situation, the gain of the amplifier in the first detection sub-circuit U5 and the second detection sub-circuit U6 is selected, and the resistance of the first resistor R1 and the third resistor R3. For example, the gain of the amplifier can be 725, the resistance of the first resistor R1 is 400 ohms, the resistance of the third resistor R3 is 10 ohms. The gain of the amplifier can also be 100, the resistance of the first resistor R1 is 100 ohms, the resistance of the third resistor R3 is 10 ohms. The gain of the amplifier can also be 200, the resistance of the first resistor R1 is 100 ohms, the resistance of the third resistor R3 is 20 ohms.

In the specific implementation, the control circuit U3 pin MCLR and PGC used to burn the corresponding control program, pins DGND and PGD for the ground pin.

In the specific implementation, Referring to FIG. 15, portable lights after an external power supply, the first voltage conversion circuit U1 converts the voltage inputted from the external power source after voltage conversion, provides power supply voltage for other circuits of portable lamps. When the user inputs the lighting control command through the input circuit SW1, after the control circuit U3 detects the lighting control command, the enable signal EN is transmitted to the second voltage conversion circuit U2, and transmits the drive signal DRV to the current regulating circuit 723. As shown in Fig. The control circuit U3 monitors the current state of the rechargeable battery 721 in real time by the battery state detection circuit 724, the operating current of the lighting circuit 722 is adjusted by the current regulating circuit 723 on the one hand, so that the rechargeable battery 721 is maintained in a charged state, which can improve the life of rechargeable batteries.

It will be understood by those of ordinary skill in the art that all or a portion of the various methods of the various embodiments of the embodiments described above may be accomplished by means of a program to instruct the associated hardware, the program may be stored in a computer readable storage medium, the storage medium may include a ROM, a RAM, a magnetic disk, or an optical disk.

EXAMPLE 1

Title

This non-limiting example illustrates an embodied lighting assembly referred to as torch assembly.

A lighting assembly with the following general features:

Fits in a GoPro session cage or similar type camera cage design. Can achieve 2700K daylight light temperature. The LED can achieve 2200 lumen. The Beam angle matches both the human eye and a GoPro wide angle.

There is a blended/smooth lux beam which avoids a center hotspot.

The light is flicker free.

Battery life up to 4 hours.

Standard Micro USB Charge Port/Constant charge and light.

Waterproof up to 10 to 30 feet.

810 MTh SPEC.

Intelligent thermal management

2×¼" 20 mounts on the bottom and back

Embedded magnet mounting.

Build in belt clip.

Simple one touch button operation.

Torch Specifications:

Size 38 mm×38 mm/1.5 in×1.5 in.

Weight 90 grams/3.17 oz.

Color Temperature 5700K

Lumen 2200 Lumen LED

Beam angle 80

Battery Life: >4 hours at level 1; >70 minutes at level 2; >35 min at level 3; >7 hours at strobe.

Charging Micro USB charge port.

Ruggedness: 810G MTh spec. Shock/Drop/Thermal/Salt Spray Testing.

Protection: Intelligent thermal management.

2×¼" 20, Rear magnet.

Vision

We set out to create the brightest and most versatile, adventure ready LED light. A light that could keep up with unbridled creativity and imagination. A light that would enable amazing moments never before captured in low or no light conditions.

Our mission was to create a:

Best in class mobile light for photo and video professionals.

Best in class light for everyday tasks at home, at work, with a smart phone and for walking and biking Best in class light for outdoor enthusiast and extreme athletes A key design criteria was to make sure the light could go anywhere a GoPro Session 4 (and now 5) camera can go-literally!

Fit into the GoPro Session Frame and GoPro mounting system

Match or exceed waterproof and drop test specifications

Light beam angle complements camera lens' wide angle

Match battery life

Torch design goal was to go anywhere GoPro Camera can go AND fit into the GoPro and traditional camera mounting systems We wanted to make the Torch the "Swiss Army Knife" of lights so we designed in:

TWO ¼ 20 standard camera mounts to allow for flexible mounting orientations

MAGNET built into the body to quickly mount to a car hood, tail gate, pole etc

FILTERS for photographic, dive and mood effects=serious photos or serious fun!

SOFT LIGHT with a diffusion cap for a lantern like glow

QUICK CLIP for a simple and secure way to mount to a belt or backpack

Although the invention has been described with reference to the above example, it will be understood that modifications and variations are encompassed within the spirit and scope of the invention. Accordingly, the invention is limited only by the following claims.

What is claimed is:

1. A lighting apparatus comprising:
a plurality of light emitting members, encased in a durable housing; and
a diffuser and a condenser lens disposed over the plurality of light emitting members, wherein an area between the diffuser or condenser lens and the light emitting member defines a sealed cavity, and wherein the diffuser is disposed within a groove of an annular sidewall surrounding the sealed cavity;
wherein the durable housing provides waterproof protection to at least 20 feet below a water surface;
wherein the durable housing includes heat dissipation features;
wherein the lighting apparatus is less than 2 inches by 2 inches in size; and is in the general shape of a cube; and
wherein the lighting apparatus generates greater than 1000 lumens of light.

2. The lighting apparatus of claim 1, further comprising a camera storage bracket.

3. A lighting apparatus for a photographic camera device, including a light emitting member; characterized in that, also included are a diffuser and a condenser lens; the light emitting member, the diffuser, and the condenser lens are provided in this order so that the light emitted from the light emitting member is irradiated to the outside through the diffuser and the condenser lens in this order;
wherein an area between a first surface of the diffuser and the light emitting member defines a first sealed cavity, wherein the diffuser has a second surface opposite to the first surface;
wherein the diffuser is disposed within a groove of an annular sidewall surrounding the first sealed cavity; and
wherein an area between the second surface of the diffuser and a planar surface of the condenser lens defines a second sealed cavity.

4. The lighting apparatus according to claim 3, wherein the condenser lens is a Fresnel lens or a convex lens.

5. The lighting apparatus according to claim 3, characterized in that, wherein the condenser lens is provided with an antireflection film on a side of the condenser lens facing the light emitting member, and/or, the condenser lens is provided with an antireflection film on a side of the condenser lens facing opposite to the light emitting member, the antireflection film is used to increase the intensity of transmitted light.

6. The lighting apparatus according to claim 3, characterized in that, the condenser lens is a Fresnel lens, the lighting apparatus also includes a protective lens, said protective lens being fixedly disposed on a side of said Fresnel lens having a texture, an area between the protective lens and the Fresnel lens defining a third sealed cavity.

7. The lighting apparatus of claim 1, wherein a light emitting member of the light emitting members comprise a light emitting diode (LED) light.

8. The lighting apparatus of claim 3, wherein the lighting apparatus is in the general shape of a cube.

9. The lighting apparatus of claim 8, wherein the durable housing provides waterproof protection to at least 20 feet below a water surface and the durable housing includes heat dissipation features.

10. The lighting apparatus of claim 9, wherein the lighting apparatus is less than 2 inches by 2 inches in size.

\* \* \* \* \*